(12) United States Patent
Convertino et al.

(10) Patent No.: US 10,061,816 B2
(45) Date of Patent: Aug. 28, 2018

(54) METRIC RECOMMENDATIONS IN AN EVENT LOG ANALYTICS ENVIRONMENT

(71) Applicant: Informatica LLC, Redwood City, CA (US)

(72) Inventors: Gregorio Convertino, Sunnyvale, CA (US); Mark Detweiler, San Francisco, CA (US); Maoyuan Sun, Blacksburg, VA (US)

(73) Assignee: Informatica LLC, Redwood City, CA (US)

( * ) Notice: Subject to any disclaimer, the term of this patent is extended or adjusted under 35 U.S.C. 154(b) by 410 days.

(21) Appl. No.: 14/709,032

(22) Filed: May 11, 2015

(65) Prior Publication Data

US 2016/0335260 A1    Nov. 17, 2016

(51) Int. Cl.
   *G06F 17/30* (2006.01)
(52) U.S. Cl.
   CPC .... *G06F 17/3053* (2013.01); *G06F 17/30368* (2013.01); *G06F 17/30525* (2013.01); *G06F 17/30554* (2013.01)
(58) Field of Classification Search
   CPC .......... G06F 17/3053; G06F 17/30525; G06F 17/30368; G06F 17/30554
   USPC ........................................................ 707/731
   See application file for complete search history.

(56) References Cited

U.S. PATENT DOCUMENTS

2004/0249826 A1    12/2004  Bodin et al.
2007/0016399 A1    1/2007   Gao et al.
2007/0299862 A1    12/2007  Aggarwal et al.
2011/0270845 A1    11/2011  Lin et al.
2016/0092552 A1*   3/2016   Morfnios et al.
2016/0292263 A1*   10/2016  Ferrar

OTHER PUBLICATIONS

Lopez et al., Information Technology—log/Event Management Guidelines, May 12, 2009, Google, 5 pages.*
International Search Report and Written Opinion cited in corresponding International Application No. PCT/US16/30851 dated Aug. 19, 2016.

(Continued)

*Primary Examiner* — Jean B Fleurantin
(74) *Attorney, Agent, or Firm* — Amardeep S. Grewal; Reed Smith LLP

(57) ABSTRACT

A system and method are disclosed for providing metric recommendations by a cloud event log analytics system. The log analytics system includes a user interface which allows users to view metric recommendations, view, modify, annotate, delete, or create log metrics. In a first embodiment, centroid vectors are created from metadata associated with user access of log metrics. The centroid vectors are compared to metrics vectors created from log metrics and the results are ranked and provided to users as metric recommendations. In a second embodiment, classification rules are inferred for metric matrix tables containing metadata about log metric usage. Classification rules are assigned to a decision tree used to calculate composite probabilities of interest of log metrics. A recommendation matrix incorporate the composite probabilities of interest to predict the degree of interest an analytics user may have in a log metric for a given role.

25 Claims, 22 Drawing Sheets

(56) References Cited

OTHER PUBLICATIONS

Chuvakin A.A. et al., Logging and Log Management: The Authoritative Guide to Understanding the Concepts Surrounding Logging and Log Management, 2013, 460 pages.

Huang, Z., "Extensions to the k-Means Algorithm for Custering Large Data Sets with Categorical Values," Data Mining and Knowledge Discovery 2, 1998, pp. 283-304.

Lanzi, P. L. "Classification Rules Machine Learning and Data Mining (Unit 12)," 2007, 61 pages, May be retrieved at<URL:http://www.slideshare.net/pierluca.lanzi/machine-learning-and-data-mining-12-classification-rules>.

Quinlan J. R. et al., "Inferring Decision Trees Using the Minimum Description Length Principle," Information and Computation, Mar. 1989, pp. 227-248, vol. 80, No. 3.

\* cited by examiner 405 analytics logs

| Id | Time stamp | L-user ID | Role ID | Territory ID | Metrics ID |
|---|---|---|---|---|---|
| 1 | 8/9/2014 10:58 | 1 | 1 | 1 | 1 |
| 2 | 8/9/2014 14:29 | 1 | 1 | 1 | 2 |
| 3 | 8/11/2014 18:00 | 2 | 2 | 2 | 3 |
| 4 | 8/11/2014 21:31 | 2 | 2 | 2 | 4 |
| 5 | 8/14/2014 1:02 | 2 | 2 | 2 | 5 |
| 6 | 8/14/2014 4:33 | 2 | 2 | 2 | 6 |
| 7 | 8/16/2014 8:04 | 1 | 1 | 1 | 2 |
| 8 | 8/18/2014 15:06 | 1 | 1 | 1 | 2 |
| 9 | 8/18/2014 18:37 | 4 | 1 | 2 | 1 |
| 10 | 8/18/2014 22:08 | 3 | 1 | 1 | 2 |
| 11 | 8/22/2014 1:39 | 1 | 1 | 1 | 1 |
| 12 | 8/23/2014 5:10 | 2 | 2 | 2 | 5 |
| 13 | 8/24/2014 8:41 | 2 | 2 | 2 | 6 |
| 14 | 8/25/2014 12:12 | 2 | 2 | 2 | 4 |
| 15 | 8/26/2014 15:43 | 1 | 1 | 1 | 1 |
| 16 | 8/26/2014 22:45 | 1 | 1 | 1 | 2 |
| 17 | 8/30/2014 2:16 | 1 | 1 | 1 | 1 |
| 18 | 8/27/2014 19:14 | 2 | 2 | 2 | 4 |
| 19 | 8/28/2014 22:45 | 2 | 2 | 2 | 5 |
| 20 | 8/30/2014 2:16 | 2 | 2 | 2 | 6 |
| 21 | 8/30/2014 2:16 | 3 | 1 | 1 | 2 |
| ... | ... | ... | ... | ... | ... |

410 Metrics metadata

| Id | Name | Description | Public | Rating | Creation time | Last update time | When | What | Who | Where |
|---|---|---|---|---|---|---|---|---|---|---|
| 1 | Tasks-l-month | All tasks ran last month | Yes | 3.5 | 2014-07-11 | 2014-08-13 | 435.2 | 430.1 | 440.1 | 445.1 |
| 2 | Tasks-l-year | All tasks ran last year | Yes | 3.5 | 2014-07-11 | 2014-08-13 | 435.4 | 430.1 | 440.1 | 445.1 |
| 3 | DSS-l-year for NA-West | DSS tasks ran last year by professional users in NA-West | Yes | 3 | 2014-09-13 | 2014-12-09 | 435.4 | 430.2 | 440.3 | 445.2 |
| 4 | DSS-t-month | DSS tasks ran this month | No | 4 | 2014-08-09 | 2014-08-21 | 435.5 | 430.2 | 440.1 | 445.1 |
| 5 | DSS-l-year | DSS tasks ran last year | Yes | 3 | 2014-08-13 | 2014-11-09 | 435.4 | 430.2 | 440.1 | 445.1 |
| 6 | DRS tasks in NA-West | DRS tasks ran last year by professional users in NA-West | Yes | 3 | 2014-09-13 | 2014-12-09 | 435.4 | 430.3 | 440.3 | 445.2 |
| ... | | | | | | | | | | |

FIG. 4a

415 L-user roles

| ID | L-user role |
|---|---|
| 1 | Product Manager |
| 2 | Customer Success Manager |
| 3 | User Experience Professional |
| ... | ... |

420 L-user territory

| ID | L-user territory |
|---|---|
| 1 | North America |
| 2 | Europe |
| 3 | Asia Pacific |
| ... | ... |

425 L-user ID

| ID | L-user name |
|---|---|
| 1 | Adam Apple |
| 2 | Brian Beats |
| 3 | Chris Cherry |
| 4 | David Dates |
| ... | ... |

430 Tasks (What)

| ID | Task Name | Task Description |
|---|---|---|
| 1 | All | All tasks |
| 2 | DSS | Data Synchronization Service |
| 3 | DRS | Data Replication Service |
| 4 | PCS | Power Center Service |
| ... | ... | ... |

435 Time period (When)

| ID | Time period | Start date | End date |
|---|---|---|---|
| 1 | All | | |
| 2 | Last month | | |
| 3 | Last quarter | | |
| 4 | Last year | | |
| 5 | This month | | |
| 6 | Release 1 | | |
| 7 | Release 2 | | |
| ... | ... | | |

440 User classes (Who)

| ID | User class | User class description |
|---|---|---|
| 1 | All | All users with any access |
| 2 | Regular | Users with basic license |
| 3 | Professional | Users with professional license |
| ... | ... | ... |

445 Territory (Where)

| ID | User territory | User territory description |
|---|---|---|
| 1 | All | All territories |
| 2 | NA-West | USA & Canada West coast users |
| 3 | NA-East | USA & Canada East coast users |
| 4 | NA-Center | USA & Canada Central or Mountain and islands users |
| ... | ... | ... |

FIG. 4b

| # | Name (M.) | Leaser ID (M.) | Territory ID (M.) | When (M.) | What (M.) | Who (M.) | Where (M.) | Rec. | Role ID |
|---|---|---|---|---|---|---|---|---|---|
| 1 | DRSS tasks in NA-West (A.) | Adam Apple (B.) | North America (C.) | Release 1 (D.) | All tasks (E.) | All users with any access (F.) | All territories (G.) | no | Product Manager |
| 2 | Tasks-1-year (A.) | Adam Apple (B.) | North America (C.) | Last year (D.) | All tasks (E.) | All users with any access (F.) | All territories (G.) | no | Product Manager |
| 3 | Tasks-1-month (A.) | Adam Apple (B.) | North America (C.) | Last month (D.) | All tasks (E.) | All users with any access (F.) | All territories (G.) | no | Product Manager |
| 4 | DSSS-1-year for NA-West (A.) | Brian Beats (B.) | Europe (C.) | Last year (D.) | Data Synchronization Service (E.) | Users with professional license (F.) | USA & Canada East coast users (G.) | no | Product Manager |
| 5 | DSSS-year (A.) | Brian Beats (B.) | Europe (C.) | Last year (D.) | Data Synchronization Service (E.) | All users with any access (F.) | All territories (G.) | yes | Product Manager |
| 6 | Tasks-1-month (A.) | Adam Apple (B.) | North America (C.) | Last month (D.) | All tasks (E.) | All users with any access (F.) | USA & Canada East coast users (G.) | no | Product Manager |
| 7 | Tasks-1-year (A.) | Brian Beats (B.) | Europe (C.) | Last year (D.) | Data Synchronization Service (E.) | All users with any access (F.) | All territories (G.) | yes | Product Manager |
| 8 | Tasks-1-month (A.) | Adam Apple (B.) | North America (C.) | This month (D.) | Data Synchronization Service (E.) | Users with professional license (F.) | All territories (G.) | no | Product Manager |
| 9 | Tasks-1-year (A.) | Brian Beats (B.) | Europe (C.) | Last year (D.) | All tasks (E.) | All users with any access (F.) | All territories (G.) | no | Product Manager |
| 10 | Tasks-1-month (A.) | Adam Apple (B.) | North America (C.) | Last year (D.) | All tasks (E.) | All users with any access (F.) | All territories (G.) | yes | Product Manager |
| 11 | DSSS-1-year (A.) | Chris Cherry (B.) | North America (C.) | Last year (D.) | Data Replication Service (E.) | All users with any access (F.) | All territories (G.) | yes | Product Manager |
| 12 | Tasks-1-year (A.) | Brian Beats (B.) | Europe (C.) | Last year (D.) | Data Synchronization Service (E.) | Users with professional license (F.) | USA & Canada East coast users (G.) | yes | Product Manager |
| 13 | Tasks-1-month (A.) | Brian Beats (B.) | Europe (C.) | Last year (D.) | Data Replication Service (E.) | All users with any access (F.) | All territories (G.) | no | Product Manager |
| 14 | DSSS-1-year (A.) | David Dates (B.) | Europe (C.) | Release 1 (D.) | Data Replication Service (E.) | All users with any access (F.) | USA & Canada East coast users (G.) | no | Product Manager |
| 15 | Tasks-1-year (A.) | Adam Apple (B.) | North America (C.) | Last year (D.) | All tasks (E.) | All users with any access (F.) | All territories (G.) | yes | Product Manager |
| 16 | Tasks-1-month (A.) | Brian Beats (B.) | Europe (C.) | This month (D.) | Data Synchronization Service (E.) | All users with any access (F.) | All territories (G.) | no | Product Manager |
| 17 | DSSS-1-year for NA-West (A.) | Chris Cherry (B.) | North America (C.) | Release 1 (D.) | All tasks (E.) | All users with any access (F.) | All territories (G.) | yes | Product Manager |
| 18 | Tasks-1-year (A.) | Adam Apple (B.) | North America (C.) | Last year (D.) | All tasks (E.) | All users with any access (F.) | All territories (G.) | no | Product Manager |
| 19 | Tasks-1-month (A.) | David Dates (B.) | Europe (C.) | Last month (D.) | All tasks (E.) | All users with any access (F.) | All territories (G.) | no | Product Manager |
| 20 | DSSS-1-year (A.) | Brian Beats (B.) | Europe (C.) | Last year (D.) | Data Synchronization Service (E.) | All users with any access (F.) | All territories (G.) | yes | Product Manager |

FIG. 13A

| Metric Name (M.ᵢ) | Loser ID (M.ᵢ) | Territory ID (M.ᵢ) | When (M.ᵢ) | What (M.ᵢ) | Who (M.ᵢ) | Where (M.ᵢ) | Rec | Role ID |
|---|---|---|---|---|---|---|---|---|
| DSS-tasks in NA-West (A.ᵢ) | Adam Apple (B.ᵢ) | North America (C.ᵢ) | Release 1 (D.ᵢ) | All tasks (E.ᵢ) | All users with any access (F.ᵢ) | All territories (G.ᵢ) | no | Product Manager |
| DSS-tasks in NA-West (A.ᵢ) | Brian Beads (B.ᵢ) | Europe (C.ᵢ) | Release 1 (D.ᵢ) | Data Replication Service (E.ᵢ) | Users with professional license (F.ᵢ) | USA & Canada East coast users (G.ᵢ) | yes | Product Manager |
| DSS-tasks in NA-West (A.ᵢ) | David Bolies (B.ᵢ) | Europe (C.ᵢ) | Release 1 (D.ᵢ) | Data Replication Service (E.ᵢ) | Users with professional license (F.ᵢ) | USA & Canada East coast users (G.ᵢ) | no | Product Manager |
| DSS-1 year for NA-West (A.ᵢ) | Brian Beads (B.ᵢ) | Europe (C.ᵢ) | Last month (D.ᵢ) | Data Synchronization Service (E.ᵢ) | Users with professional license (F.ᵢ) | USA & Canada East coast users (G.ᵢ) | no | Product Manager |
| DSS-1 year for NA-West (A.ᵢ) | Brian Beads (B.ᵢ) | Europe (C.ᵢ) | Last year (D.ᵢ) | Data Synchronization Service (E.ᵢ) | Users with professional license (F.ᵢ) | USA & Canada East coast users (G.ᵢ) | yes | Product Manager |
| DSS-1 year for NA-West (A.ᵢ) | Chris Cherry (B.ᵢ) | North America (C.ᵢ) | Last year (D.ᵢ) | All tasks (E.ᵢ) | All users with any access (F.ᵢ) | All territories (G.ᵢ) | yes | Product Manager |
| DSS-1 year for NA-West (A.ᵢ) | Chris Cherry (B.ᵢ) | North America (C.ᵢ) | Last year (D.ᵢ) | Data Replication Service (E.ᵢ) | All users with any access (F.ᵢ) | All territories (G.ᵢ) | no | Product Manager |
| DSS-1 year (A.ᵢ) | Brian Beads (B.ᵢ) | Europe (C.ᵢ) | Last year (D.ᵢ) | Data Synchronization Service (E.ᵢ) | All users with any access (F.ᵢ) | All territories (G.ᵢ) | no | Product Manager |
| DSS-1 year (A.ᵢ) | Brian Beads (B.ᵢ) | Europe (C.ᵢ) | Last year (D.ᵢ) | Data Synchronization Service (E.ᵢ) | All users with any access (F.ᵢ) | USA & Canada East coast users (G.ᵢ) | yes | Product Manager |
| DSS-1 year (A.ᵢ) | Brian Beads (B.ᵢ) | Europe (C.ᵢ) | Last year (D.ᵢ) | Data Synchronization Service (E.ᵢ) | All users with any access (F.ᵢ) | All territories (G.ᵢ) | no | Product Manager |
| DSS-1 month (A.ᵢ) | Brian Beads (B.ᵢ) | Europe (C.ᵢ) | This month (D.ᵢ) | Data Synchronization Service (E.ᵢ) | All users with any access (F.ᵢ) | USA & Canada East coast users (G.ᵢ) | no | Product Manager |
| DSS-1 month (A.ᵢ) | Brian Beads (B.ᵢ) | Europe (C.ᵢ) | This month (D.ᵢ) | Data Synchronization Service (E.ᵢ) | All users with any access (F.ᵢ) | USA & Canada East coast users (G.ᵢ) | no | Product Manager |
| Tasks-1 month (A.ᵢ) | Adam Apple (B.ᵢ) | North America (C.ᵢ) | Last month (D.ᵢ) | All tasks (E.ᵢ) | All users with any access (F.ᵢ) | All territories (G.ᵢ) | no | Product Manager |
| Tasks-1 month (A.ᵢ) | Adam Apple (B.ᵢ) | North America (C.ᵢ) | Last month (D.ᵢ) | All tasks (E.ᵢ) | All users with any access (F.ᵢ) | All territories (G.ᵢ) | no | Product Manager |
| Tasks-1 month (A.ᵢ) | David Bolies (B.ᵢ) | Europe (C.ᵢ) | Last month (D.ᵢ) | All tasks (E.ᵢ) | All users with any access (F.ᵢ) | All territories (G.ᵢ) | no | Product Manager |
| Tasks-1 month (A.ᵢ) | Adam Apple (B.ᵢ) | North America (C.ᵢ) | Last month (D.ᵢ) | All tasks (E.ᵢ) | All users with any access (F.ᵢ) | All territories (G.ᵢ) | no | Product Manager |
| Tasks-1 year (A.ᵢ) | Adam Apple (B.ᵢ) | North America (C.ᵢ) | Last year (D.ᵢ) | All tasks (E.ᵢ) | All users with any access (F.ᵢ) | All territories (G.ᵢ) | yes | Product Manager |
| Tasks-1 year (A.ᵢ) | Adam Apple (B.ᵢ) | North America (C.ᵢ) | Last year (D.ᵢ) | All tasks (E.ᵢ) | All users with any access (F.ᵢ) | All territories (G.ᵢ) | yes | Product Manager |
| Tasks-1 year (A.ᵢ) | Chris Cherry (B.ᵢ) | North America (C.ᵢ) | Release 1 (D.ᵢ) | All tasks (E.ᵢ) | All users with any access (F.ᵢ) | All territories (G.ᵢ) | no | Product Manager |

FIG. 13B

| | Metric Name (M₁) | L-user ID (M₂) | Territory ID (M₃) | What (M₄) | Who (M₅) | Where (M₆) | Rec. | Role ID |
|---|---|---|---|---|---|---|---|---|
| 1 | DSS-1-year for NA-West (A₂) | Brian Beats (B₂) | Europe (C₁) | Data Synchronization Service (E₁) | Users with professional license (F₂) | USA & Canada East coast users (G₂) | no | Product Manager |
| 2 | DSS-1-year for NA-West (A₂) | Chris Cherry (B₃) | North America (C₂) | All tasks (E₁) | All users with any access (F₁) | All territories (G₁) | yes | Product Manager |
| 3 | DSS-1-year for NA-West (A₂) | Chris Cherry (B₃) | North America (C₂) | All tasks (E₁) | All users with any access (F₁) | All territories (G₁) | no | Product Manager |
| 4 | DSS-1-year for NA-West (A₂) | Chris Cherry (B₃) | North America (C₂) | Data Replication Service (E₁) | All users with any access (F₁) | All territories (G₁) | yes | Product Manager |
| 5 | DSS-1-year (A₁) | Brian Beats (B₂) | Europe (C₁) | Data Synchronization Service (E₁) | All users with any access (F₁) | All territories (G₁) | yes | Product Manager |
| 6 | DSS-1-year (A₁) | Brian Beats (B₂) | Europe (C₁) | Data Synchronization Service (E₁) | All users with any access (F₁) | All territories (G₁) | yes | Product Manager |
| 7 | DSS-1-year (A₁) | Brian Beats (B₂) | Europe (C₁) | All tasks (E₁) | All users with any access (F₁) | All territories (G₁) | yes | Product Manager |
| 8 | Tasks-1-year (A₆) | Adam Apple (B₁) | North America (C₂) | All tasks (E₁) | All users with any access (F₁) | All territories (G₁) | yes | Product Manager |
| 9 | Tasks-1-year (A₆) | Adam Apple (B₁) | North America (C₂) | All tasks (E₁) | All users with any access (F₁) | All territories (G₁) | yes | Product Manager |
| 10 | Tasks-1-year (A₆) | Adam Apple (B₁) | North America (C₂) | All tasks (E₁) | All users with any access (F₁) | All territories (G₁) | no | Product Manager |
| 11 | Tasks-1-year (A₆) | Adam Apple (B₁) | North America (C₂) | All tasks (E₁) | All users with any access (F₁) | All territories (G₁) | yes | Product Manager |

| Attribute | Ratio | % | Attribute | Ratio | % |
|---|---|---|---|---|---|
| A2 | 2/3 | 0.667 | E1 | 5/6 | 0.833 |
| A3 | 2/3 | 0.667 | E2 | 3/3 | 0.900 |
| A6 | 3/4 | 0.750 | E3 | 2/3 | 0.667 |
| B1 | 3/4 | 0.750 | F1 | 7/8 | 0.875 |
| B2 | 2/3 | 0.667 | G1 | 8/9 | 0.889 |
| B3 | 2/3 | 0.667 | G2 | 1/1 | 0.900 |
| C1 | 2/3 | 0.667 | | 5/7 | 0.714 |
| C2 | 5/6 | 0.833 | | | |

FIG. 13C

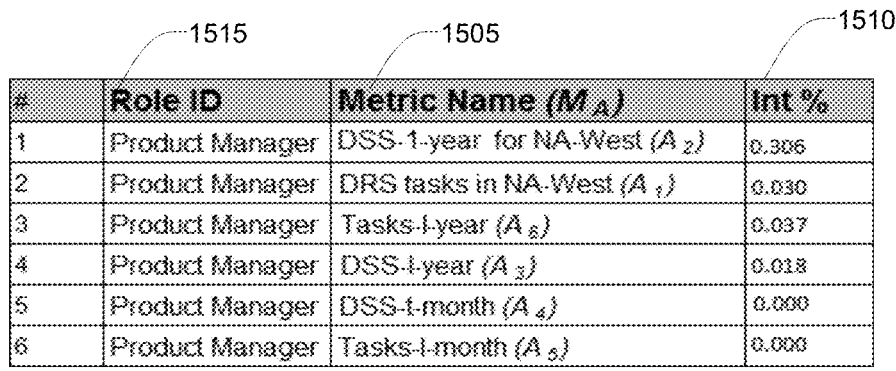
FIG. 15                                                           1500

METRIC RECOMMENDATIONS IN AN EVENT LOG ANALYTICS ENVIRONMENT

BACKGROUND

Field of Art

The disclosure relates to data processing of log files from cloud based software applications, and more specifically to identifying and recommending specific metrics of application usage based on cloud application log files.

Description of the Related Art

Many enterprise systems and applications such as CRM systems, payroll systems, databases, accounting system, document management systems, file systems, and so forth generate event logs each time an end-user access the application, for example to open a file, update an data item, or perform some other task or operation. These event logs are a key resource for log analysts to understand software usage and functionality in an enterprise. For example, programmers and operations teams have used operating system and application event logs to identify root causes of failure in computing systems, security and compliance experts have used logs to identify intrusion attempts or unusual activities, and user experience designers have used logs to understand end users' behavior via metrics such as application adoption, usage of specific features and task success.

Current practices in log analytics are limited by two general challenges: 1) a unified representation of overall system usage is difficult to obtain because log data about different modules or functions of a system or application is often fragmented across multiple isolated tools having different log formats and data analysis capabilities; 2) even for the same system module or function, alternative versions or aggregations of log data may exist, which may lead to inconsistent query or analysis results on the logs.

SUMMARY

An event log analytics system provides metric recommendations for analyzing the usage of software applications in and between enterprises. The system provides different analytics users in different capacities the ability to aggregate, analyze, and visualize application event logs, with recommendations that can be specific to that analytics user, the analytics user's role, location, time period, operation, or other constraints. Event logs are a chronological record of application events that enables users to manage system resources, resolve application errors, and gain insights to into application or end user behavior. Analytic users such as application designers (e.g. user experience designers), product developers (e.g. product manager), software developers (e.g., software engineers), software troubleshooters (e.g. IT staff), sales and marketing professionals (e.g. customer success managers, sales or marketing data analysts), customer support professionals (e.g., helpdesk managers, on-site support professionals), or administrators (e.g. application administrators) create and use log metrics that are queries of the event logs to identify specific variables or application behavior of interest.

Log metrics are quantitative or categorical measurements of application event logs. Log metrics are characterized by time period, operation, users and location. For example, a user may generate a metric of measuring the use of particular application functions with an given time period; another metric to measure a change in the number of password failures month to month over time period with respect to alternative login page designs or different user locations. It has been observed that different users with different capacities or occupational roles may generate or use similar metrics.

A unified data model is used to provide structure and contextualization to log metrics and parameterization data contained within log metrics from event logs generated by different applications. This is beneficial because different applications generate different formats for logs. Thus the data model provides a unified method to represent different types of event log data arising from different sources. Users are provided access to log metrics through a user interface of the log analytics system. Through the user interface, users may visualize, analyze, and edit existing metrics, generate additional metrics, or receive metric recommendations across user classes such as roles, locations, time periods, or operations.

To provide recommendation metrics, the log analytics system makes use of the property that a frequency in which a log metric is accessed is proportional to its significance to the user community. The more often a user (or a class of users) accesses a log metric the more significant and thus meaningful the log metric becomes to the user (or class). The behavioral usage of log metrics by a user can then be represented within the log analytics system by the total log metrics accessed and by the log metrics accessed most frequently by that user. Additionally, the log analytics system can aggregate the behavioral usage of a plurality of users by according to various dimensions, such as user role, user location, time period, user operation or combinations thereof. The log analytics system is able to compare, for similarity, the behavioral representation of log metric usage for any or all log metrics by any or all users. Second, the log analytics system makes use of the property that similarity of metrics implies relevance and therefore usefulness. Log metrics that are compared favorably with the behavioral representation are ranked according to similarity and provided as metric recommendations to the user.

In one embodiment, the metric recommendations are generated using metric vectors. Each log metric is represented by a metric vector in a vector space. The components of the metric vector correspond to terms used in the name and description of the vector, terms from comments on the metric, tags, and internal usage flags. Additional components of the vector represent metadata characteristics of the metric, such as user, group, organization, location. Other components of a metric vector are based on the names of the underlying table(s) and columns used by the metric to query the event logs, and textual data extracted from high frequency words appearing in queried columns themselves. The values of the metric components are then based on measures of term frequency of the terms, such as term-frequency, inverse document frequency (TF-IDF). The vector representation of different metrics enables them to be compared based on a measure of similarity (equivalently, similarity score) such as cosine similarity. The metric vector representation is further extended to users, roles, classes, territories, or other groupings of the user community. Thus a user is represented by a metric vector which is derived from the set of metrics that the user has created or used. For example, a user metric vector may be computed as the centroid of the metric vectors created and used by the user. A role metric vector, for example, a metric vector for product managers, may be derived as the centroid of the metric vectors of all metrics utilized by users who are product managers. This approach may be continued both within and across enterprises, so that users in entirely different companies may nonetheless benefit from the metrics developed by each other, even though they may have different occupational roles.

Given the metric representation, metric recommendations are based on the similarity measures. In a first aspect, given a user selection of a metric of interest, the system obtains the corresponding metric vector and identifies other metrics having similar metric vectors. These similar metrics may be recommended to the user.

In another aspect, given a user, the system obtains the metric corresponding to the user, and then identifies metrics that have similar metric vectors. For example, when the user logs into the system, the system can automatically identify and recommend new metrics that may be of interest to the user since their last session. As another example, given the user's role (e.g., product manager), the system can automatically identify metrics that have vectors that are similar to the metric vector for the user's role, and recommend such metrics. As another example, given the user's location (e.g., a particular division of an enterprise), the system can automatically identify metrics that are similar to a metric vector computed for the user's location. As can be appreciated, the vector representation of both the metrics themselves and any level of aggregated entity (e.g., user, role, location, etc.) provides a very flexible and extendible recommendation system.

In one aspect, a computer system is implemented for providing log metric recommendations. The system comprises a data management module to extract and organize the content of log metric data, a recommendation module to provide log metric recommendations using vector representations of the log metrics, a dashboard module configured to interface a user with a log analytics system, a database access module configured to identify, store and retrieve data located in a database, and a service agent module configured to access information via a network from a database system, client devices, and web services.

A method for generating log metric recommendations is implemented. The method comprises defining a class of users of the log analytics system, wherein a class of users comprises user capacities; generating a metric vector, each metric vector comprising a set of index terms, wherein each metric vector corresponds to a log metric in a database; generating term weights values for each index term in a metric vector, generating a centroid vector comprised of an aggregate of metric vectors, calculating a similarity between the centroid vector and metric vectors, generating and rank similarity scores of metric vectors to the centroid vector, and providing recommendations of log metrics associated with the metric vectors that exceed a threshold.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

FIGS. 4a and 4b shows metric query tables containing log metric access metadata, according to one embodiment.

FIGS. 13a-13d show example metric matrix tables used to infer classification rules for assignment in decision tree, according to one embodiment.

FIGS. 14a-4d show examples of a decision tree used to calculate composite probabilities of interest for log metrics, according to one embodiment.

FIG. 15 shows a recommendation matrix used to predict the degree of interest an analytics user may have in a log metric for a given role.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

Figure 1:
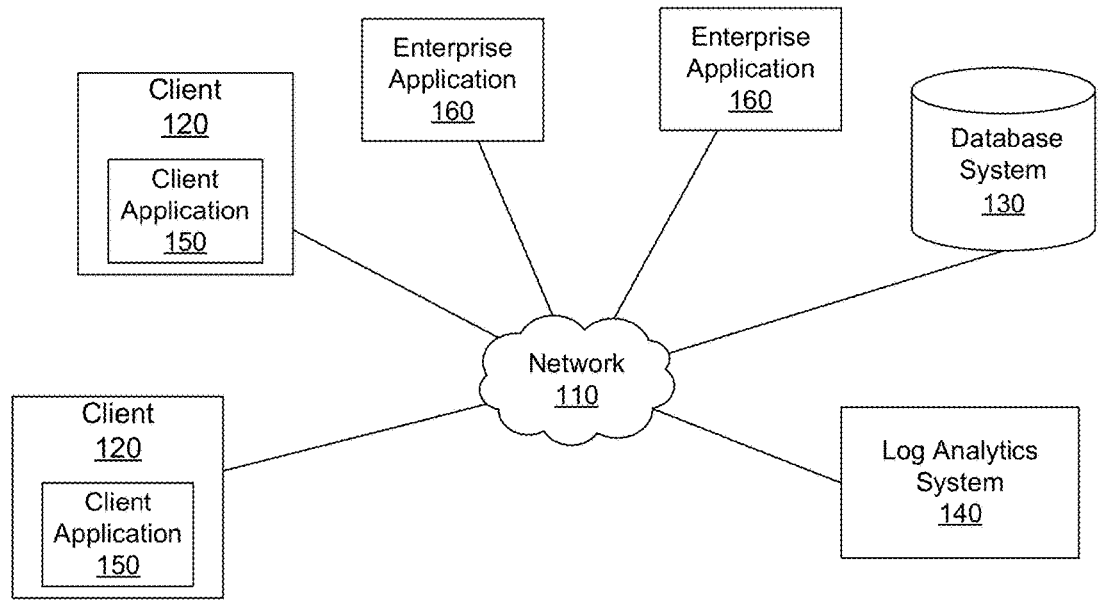
FIG. 1 shows an overall system environment for a log analytics system, according to one embodiment.

FIG. 1 shows an overall system environment 100 for of a log analytics system providing application log metric recommendations, according to one embodiment. The overall system environment 100 includes a log analytics system 140, database system 130, client devices 120, multiple enterprise applications 160, and a network 110. The client devices 120 interact with the log analytics system 140 via the network 110. In other embodiments, more or less components than those indicated in FIG. 2 may be used. For purposes of explanation and clarity it is useful to identify two types of users. An end user is user who accesses enterprise applications 160 either directly over the network 110 or via a client application 150 to perform various tasks and operations on enterprise database. It is the activities of end users that generate the event logs used by the log analytics system 140. The second type of user is the analytics user, who accesses the log analytics system 140 to use and generate metrics of enterprise application and end-user behavior. A given individual user may be both an end user at some points, and an analytics user at others. In the following discussion, references to a "user" in the context of the use of the log analytics system 140 is understood to refer to an analytics user.

The client 120 device is a computer system with a processor and memory (e.g., a desktop or laptop computer) configured to communicate with the system 140. Client 120 devices run an application layer of software as a service cloud applications and is used to interact with the log analytics system 140 via the network 110.

Figure 5:
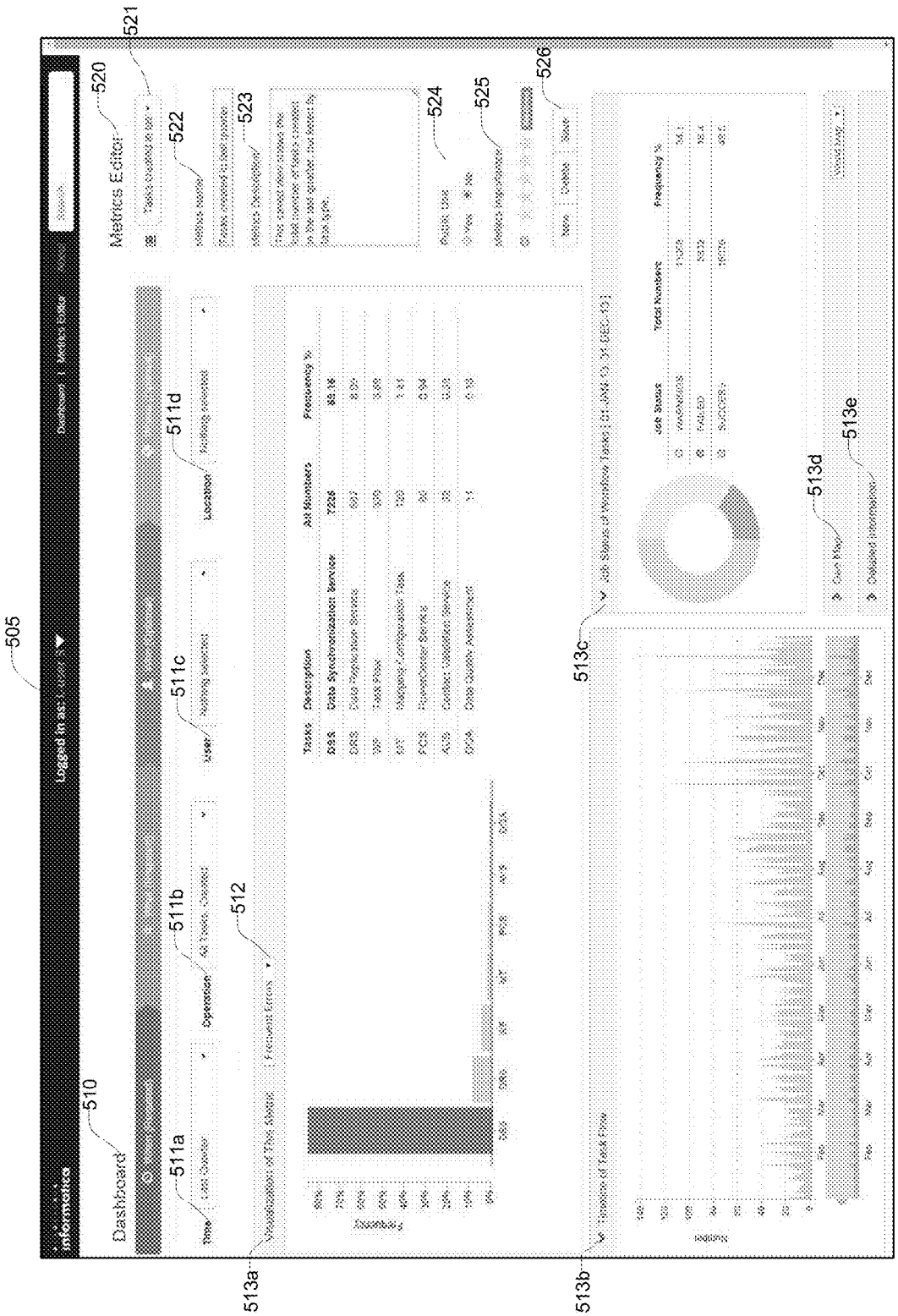
FIG. 5 shows a first screenshot of a user interface of a client application that allows a user to interact with a log analytic system, according to one embodiment.

Included in the client 120 device is a client application 150 which communicates with the log analytics system 140, and provides the user interface, described in conjunction with FIG. 5. The client application 150 provides a mechanism for analytics users to interact with application log metric parameterizations. The client application 150 may process visualization and editing of log metrics locally through the resources of client device 120 before sending the data through the network 110. Data sent through the network 110 is received by the log analytics system 140 where it may be processed for storage, retrieval, recording, or analysis. The log analytics system 140 may direct retrieval and storage request to the database system 130 as required by the client application 150. In an embodiment, the client application 150 may be an internet browser, which includes client side programming (e.g., Java Script) when accessing the log analytics platform 140. In other embodiments, the client application 150 may be a proprietary application developed for interacting with the log analytics platform 140.

The log analytics system 140 is hosted on a computing system that includes one or more processors, memory, secondary storage and input/output controller. The computing system used to host software architecture for supporting cloud based software applications and the log analytics system 140. The computing system is typically a server class system that uses powerful processors, large memory, and fast input/output systems compared to a typical computing system used, for example, as a client device. The server typically has large secondary storage, for example, using a RAID (redundant array of independent disks) array. Additionally, the computing system includes an operating system, for example, a UNIX operating system, LINUX operating system, or a WINDOWS operating system. The operating system manages the hardware and software resources of the log analytics system 140 and also provides various services, for example, process management, input/output of data, management of peripheral devices, and so on. The operating system provides various functions for managing files stored on a device, for example, creating a new file, moving or copying files, transferring files to a remote system, and so on.

Specifically, the log analytics system 140 contains resources to access and process corresponding event logs generated by the enterprise applications 160. The event logs are stored in the database system 130, and are processed, modeled, and analyzed by the system 140 and resulting data is provided to client devices 120 for user consumption. In support of communication with client devices 120, the log analytics system 140 may receive requests from client devices 120 and then retrieve the requested data from the database system 130, perform updates to the database system 130, or send commands for execution to the database system 130. Additionally, the log analytics system 140 may analyze event logs or metric parameterizations and provide the results in the form of recommendations to client 120 devices.

The database system 130 includes one or more systems for managing and storing application event logs, metric parameterizations, and metric query logs and providing read or write access to the data. Each database system 130 stores data according to defined database schemas. Typically, data storage schemas across different data sources vary significantly even when storing the same type of data including cloud application event logs and log metrics, due to implementation differences in the underlying database structure. The database system 130 may also store different types of data such as structured data, unstructured data, or semi-structured data. Data in a database system 130 may be associated with users, groups of users, entities, and/or workflows. The database system 130 provides support for database queries in a query language (e.g. SQL) for specifying instructions to manage database objects represented by the database system 130, read information from the database system 130, or write to the database system 130.

The network 110 represents the communication pathways between the client 120 device, the log analytics system 140, and the database system 130. In one embodiment, the network 110 uses standard Internet communications technologies and/or protocols. Thus, the network 110 can include links using technologies such as Ethernet, IEEE 802.11, integrated services digital network (ISDN), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

System Architecture

Figure 2:
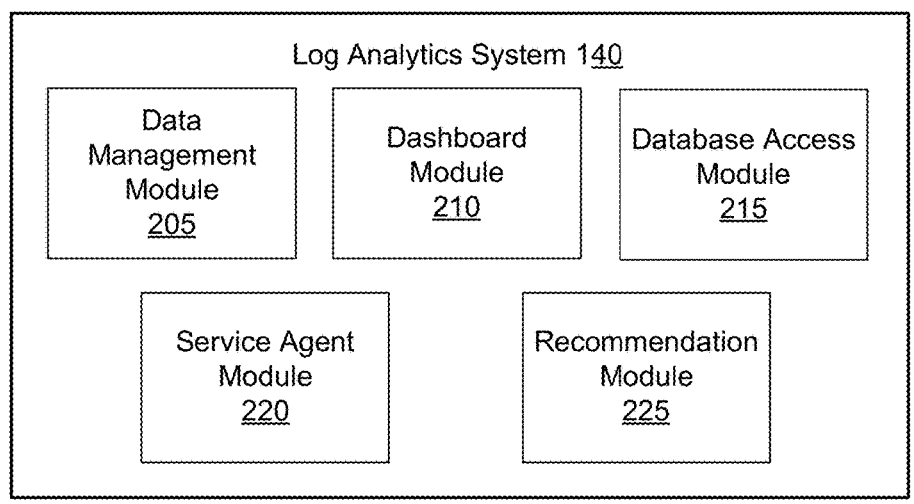
FIG. 2 shows a system architecture of an log analytics system, according to one embodiment

FIG. 2 shows the system architecture of the log analytics system 140, according to an embodiment. The log analytics system 140 includes a data management module 205, dashboard module 210, database access module 215, a service agent module 220, and a recommendation module 225. In other embodiments, log analytics system 140 may include other modules not described herein. Functionality indicated as provided by a particular module may be implemented by other modules instead. None of the foregoing modules are native components of a generic computer system. Each of these modules is implemented by respective program code that performs the algorithms and functions described below; in no case are the algorithms or functions described herein performed by humans by mental steps, nor could such operations be performed by mental steps in any practical embodiment recognized by those of skill in the art.

The data management module 205 comprises program code that is configured to manage log metric data for the log analytics system 140 from the database 130. The data management module 205 is provided access to event logs generated from enterprise applications 160 via the network 110. The access allows the data management module 205 to monitor and capture the event log activity of multiple various software applications, including cloud based applications, with multiple users in various roles across different organizations.

Data captured from the event log activity are organized into log metrics; categorical or quantitative informational measurements that characterize behaviors of the enterprise applications. Like event logs, log metrics enable analytics users to manage system resources, resolve application errors, and gain insight into application or end user behavior. Unlike event logs that are organized by chronologically driven events, log metrics are represented with respect to analytics user defined data points that give context to the log metrics. For example, an IT manager may be interested as to the frequency of errors for all application tasks that occurred in the last year. Using a log analytics system 140, the IT manager may create a log metric and specify parameterizations that contain log event data (e.g. time period, all task, and error frequency). The log analytics system 140 extracts data from the event log of the application and aggregates the data under the log metric.

Without a means for structure or contextualization the acquisition of heterogeneous event log data may tend toward informational disorder. Included in the data management module 205 is a metric parameterization model 300 that provides organizational meaning between parameterizations of event log data aggregated under a log metric.

Figure 3:
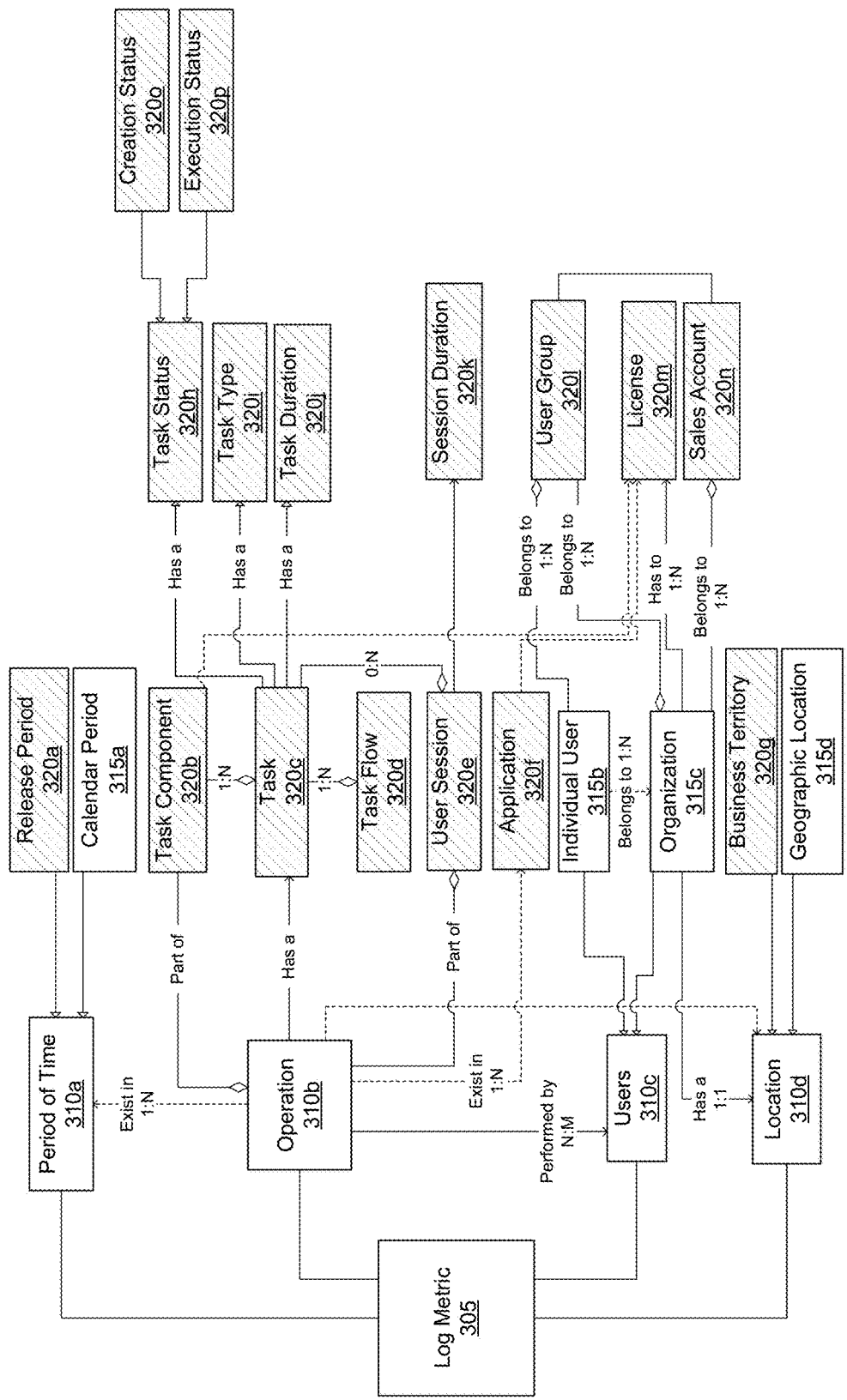
FIG. 3 shows a metric parameterization model for construction of a log metric in a log analytics system, according to one embodiment.

Turning now to FIG. 3, a metric parameterization model 300 comprises program code that stores a hierarchical data structure that defines the composition of log metrics 305 through metric parameterizations (310, 315, and 320). Metric parameterizations are variables populated with data values extracted from event logs by the data management module 205. Metric parameterizations maintain symbolic names and are stored in corresponding data tables or structures in the database 130. As the data in the event logs are updated, the data management module 205 updates the values of the metric parameterizations in the database 130. The values of held in the metric parameterizations give contextual meaning to the log metric 305 through the data extracted from event logs.

The metric parameterization model 300 is arranged in a hierarchy of metric parameterizations that describe the log metric 305. At the highest level is a parameterization that holds a textual name for the log metric 305, defined by an analytics user. At the second level of the hierarchy are interrogative 310 metric parameterizations that categorize captured log event data into four factors of log metric usage: a time period, an operation, an analytics user, and a location (informally, "when," "what," "who," and "where"). The interrogative metric parameterization 310a describes event log data that relate to the metric usage of time in terms of calendar or application release periods. The interrogative metric parameterization 310b describes operations performed in the application whether from users or by application function. The interrogative metric parameterization 310c describes individual or organizational users that have used the application and appear in event logs. The interrogative metric parameterization 310d describes the physical usage of the application in terms of business territory or geographic location. Interrogative 310 metric parameterizations do not receive values directly, they hold values filtered from parameterizations lower in the hierarchy.

The explicative metric parameterizations (315, 320) further characterize the log metric 305 and directly receive extracted event log data. The explicative metric parameterizations can be further categorized into general parameterizations 315 or application specific 320 parameterizations. The general parameterizations 315 hold values that are common across all cloud applications while application specific parameterizations 320 have values that may vary across applications. For example, an enterprise application may generate a log event for each end user login error; a logic metric 305 would then be Login Frequency Error, which tracks the frequency, location, and end users for which this event occurred. The log metric Frequency Error contains, amongst other metric parameterizations, a period of time 310a which may hold time usage values for a calendar period 315a: last year, last quarter, last month, last week, or last day. The metric parameterization operation 310b stores the information identifying the login operation and the error state. The metric parameterization users 310c may hold values for individual end users 315b (e.g. end users that had a failed login attempt) or organizations 315c. The metric parameterization location 310d may hold values for the location 320g in which the login error occurred (e.g. a particular geographic region, business unit, or the like). A cloud application typically has event log data related to the application specific parameterization, task 320c but the application specific parameterization license 320m may not have any values associated with the event log of that application. In an embodiment the total amount of application specifics parameterizations 320 is variable; meaning that further application specific parameterizations may be added or decreased.

Turning now to FIGS. 4A and 4B, the data management module 205 comprises program code that is configured to monitor the usage of log metrics and metric parameterizations using metrics tables. The accessing of categorical or quantitative informational log metric data by users of the log analytics system 140 is via a metric query. The recorded metadata values associated with metric queries are stored and formatted according to the metric tables. Metric queries give the log analytics system 140 the ability to determine which log metrics are accessed by users across by roles, location, or operation and thus a measure of a log metric's significance. The metric query metadata values are provided to the recommendation module 225 as input for recommendations of log metrics.

When a log metric is created, edited, or viewed the data management module 205 generates a metric query entry into metric query table 405, essentially maintaining a log of metric query events. Each entry contains metadata values that define the metric query such as access time stamp, metadata values for the accessing analytics user (e.g. the user's name, role, and location), and metadata values of the log metric accessed (e.g. metric name, description, public designation, importance rating, creation time, and last update time). The metric table analytics log 405 comprises entries to linked tables that describe the values under columns L-user ID, Role ID, and Metrics ID. L-user ID entries are linked to table 425 L-user ID, Role ID entries are linked to table 415 L-user roles, and Metric ID entries are is linked to table 410 Metrics metadata. The table 410 Metrics metadata contains entries for identifying information of accessed log and linked entries to tables that further define table 410. The values under the When column are linked to table 435 Time period, the values under the What column are linked to table 430 Tasks, the values under the Who column are linked to table 440 User classes, and the values under the Where column are linked to table 440 Territory. It is important to note while there may be similar types of metadata values in metric query tables 400, the tables 405, 410, 415, 420, 425 contain values that define a metric query, in other words information about who accessed a log metric and which log metrics were accessed. The tables 430, 435, 440 and 445 contain interrogative metric parameterizations 310 values that further define the log metric accessed by the user.

Take for example the metadata associated with metric query entry 1 under table 405 in FIG. 4*a*. The entry indicates L-user 1 in Role 1 accessed Metric 1 at 10:58 on Aug. 9, 2014. The tables linked to metric query 1 indicate that analytics user L-user 1 is Adam Apple 425.1 in a product manager role 415.1 and viewed the metric Tasks-1-month 410.1. A comparison between the timestamp entry for 405.1 and the last update time in entry 410.1 further indicate that the log metric was viewed and not edited. If the timestamp and last update time entry matched then the log metric would have been edited. The metric metadata table 410 provides additional metadata information about the metric 410.1 Task-1-month. A metric description is provided, public access is granted, and the log metric is rated as 3.5 in metric importance. The metric was initially created on Jul. 11, 2014 and last edited on Aug. 13, 2014. The values that correspond to the interrogative metric parameterizations 310 indicate the log metric is defined for all tasks 430.1, all users 440.1, in all territories 420.1 that occurred last month 435.2.

Returning to FIG. 2, the processing of data related log metrics or metric queries are handled by the data management module 205. The data management module 205 sends processed data to the database system 130 for storage via the database access module 215. When log metrics are edited or created by an analytics user the corresponding data is received from the dashboard module 210, updated and sent for storage to the database system 130. Likewise, when a user accesses log metrics, the information relating to the metric query is processed by the data management module 205 and stored in the database system 130. The data management module also provides log metric and metric query information to the recommendation module 225 as input for metric recommendations. In addition to monitoring the access of log metrics, the data management module 205 may control access rights of users across different roles and applications.

The dashboard module 210 comprises program code that is configured to interface the log analytics system 140 with the client application 150. The dashboard module 210 receives request for log metric or metric recommendation data sent from the client application 150, then relays the request to appropriate system modules before returning the processed data back to the client application 150 for visual rendering of the metric information.

FIG. 5 shows an example of a dashboard 510 used for displaying metric information. For example, when a Frequent Errors log metric is selected with the metric menu 512 of the dashboard 510, the client application 150 sends a request to the dashboard module 210 for the associated metric data. The dashboard module 210 receives the request, and then in turn obtains the requested metric data associated with Frequent Errors from the database system 130 via the database access module 215. The dashboard module 210 then displays requested metric data received from the database access module 215 in the client application 150. Additionally, the dashboard module 210 may present for display received metric recommendations processed by the recommendation module 225.

As described in the example above the use of log metrics is interactive. They can be user generated, edited, deleted, or shareable across users, roles, or organizations. In an embodiment log metrics that are predefined upon system initialization may also be edited, deleted or shared. The ability to share log metrics may give analytics users in different organizations experiencing a same issue alternative perspectives. Furthermore, the dashboard module 215 is configured to receive user defined metric creations, deletions, modifications through a Metrics Editor 520. The dashboard module 215 provides updated log metric information to the data manage module where the updated log metric values are processed and provided to the database access module 215 for storage in the database system 130. The dashboard module 215 simultaneously presents for display the updated log metric data via graphic visualization menus in a user interface 500 in the client application 150.

The example user interface 500 shown in FIG. 5 is a mechanism that allows analytics users to interact with log metrics. The user interface 500 includes a dashboard 510 that provides a means to view graphical representations of log metrics, and metric recommendations provided by the log analytics system. An analytics user may select existing metrics from a metric menu 512 and constrain the displayed metric data by the interrogative metric parameterizations menus time 511*a*, operation 511*b*, analytics user 511*c*, or location 511*d*. Upon selection of a log metric, and in one embodiment, a corresponding time period 511*a* and associated operation 511*b* is selected, and the graphics windows 513 are then populated with the appropriate log metric and metric parameterization data. For example, the log metric Frequent Errors is selected from the metric menu 512 and limited to all task created during the last quarter using the parameterization menus 511*a* and 511*b*. The graphics windows 513*a*, 513*b*, and 513*c* each display graphically distinct perspectives of the same metric data while graphic menus 513*d* and 513*e* are not selected for visualization. Metric recommendations can also be accessed through the metric menu 512, constrained by the interrogative metric parameterization menus, and displayed in the graphics windows 513.

The user interface 500 also includes a metric editor 520 that allows for editing, or deleting existing log metrics, or creating additional log metrics. Existing metrics can be chosen for editing through a metric editor menu 521. Once an existing log metric is selected, fields for the metrics name text 522 and metrics description text 523 are populated with previously entered textual data provided by the user who created the metric. Public use radio buttons 524 and a metrics importance rating values will also indicate any previously selections. The metric name text 522, metric description text 523 then become available for textual editing and the public use radio buttons 524 and metrics importance ratings 525 may be selected. The public use button indicates whether the metric is available to other users (yes) or only to the user who created the metric (no). The metric importance rating stores a rating by the user of the importance of the metric. This is used for ranking and evaluating metrics. The terms used in the metrics name, description, as well as public use and ratings are utilized in the construction of the metric vectors.

Updates to existing log metrics can be saved or deleted with the appropriate state button 526. New log metrics can be added with the appropriate state button 526 and edited with the metric editor as described above. The metric parameterizations associated with the new log metrics can be selected through the parameterization menus 511. The ability to create new metrics and make them publicly available to other users creates a platform by which a community of users can share metrics; over time the usage of the metrics by the community enables metric recommendations to be generated, as further described below.

Additionally, in embodiments where the client application 150 is an internet browser application, the dashboard module 210 generates the appropriate markup language objects and sends this content to the internet browser application of the client device 120 to render and display the user interface 500. In other embodiments, the client application 150 is a proprietary application, for example, a Java or C++ application. In these embodiments, the dashboard module 210 uses a library to render the user interfaces for display, for example, SWING library of the JAVA programming language.

The database access module 215 comprises program code that is configured to provide an interface for storing and retrieving data located in the database system 130. The database access module 215 identifies data in the database system 130 to be extracted or stored in response to request from other modules. The database access module 215 then extracts or stores the identified data from the database system 130 over the data access channels provided by the database system 130. In one embodiment, a data access channel is a secure data transfer protocol that allows the database access module 215 to communicate securely with the database system 130. In operation, the database access module 215 may identify one or more database systems 130 from which to extract data. The identification of the database systems 130 and/or the specific data stored therein may be made based on instructions received from the user interface 500 with the client application 150 or other log analytics system 140 modules. Alternatively, such identification may be made based on one or more log metric definitions that specify external data sources from which to extract data.

The service agent module 220 comprises program code that is configured to communicate with the database system 130 or client devices 120 and acts as an access point web services via the network 110. The service agent module 220 may communicate over networks 110 that comprises of any combination of local area and/or wide area networks, using both wired and/or wireless communication systems. The service agent module 220 may use standard communications for communicating via the network 110 including multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any suitable format, such as hypertext markup language (HTML) or extensible markup language (XML). In some embodiments, all or some of the communication over the network 110 may be encrypted using any suitable technique or techniques.

The recommendation module 225 comprises program code that is configured to generate log metric recommendations based on log metric and metric query data maintained in the metrics tables, such as illustrated in FIGS. 4a and 4b. Each log metric in the log analytics system 140 is represented by a metric vector comprised of index terms. The index terms contain values that correspond to values of the metric parameterizations of the represented log metric, along with terms based on the contents of the underlying tables and columns queried by the metric and data extracted from such columns. The recommendation module 225 requests the values of log metrics and their parameterizations stored in the database system 130 from the database access module 215 using the data to generate the term vectors. The recommendation module 225 also calculates weights for individual index terms using a term frequency-inverse document frequency schema.

The recommendation module 225 is configured to generate centroid vectors for various aggregations ("classes") of the metrics with respect to different values of the various parameterizations (role, time period, operation, location, or combination thereof) in the log analytics system 140. A centroid vector is a representation of the metrics in a class with respect to a value of one or more parameterizations; the system maintains multiple different classes and corresponding centroid vectors.

The recommendation module 225 is further configured to calculate a similarity score for any two metric vectors (including any centroid vector). The similarity score may be for example the cosine similarity between the vectors, or other similarity measure. This comparison can be done with respect to any metric vector (or aggregation thereof), and used to generate recommendations. More specifically, for a given metric vector, the recommendation module can determine the similarity between the metric vector to any number of other vectors (including centroid vectors). For a given metric vector, the metrics of those metric vectors (or centroids) that have similarity scores that exceed a threshold value are provided as recommendations to the user interface 500 via the dashboard module 210. Log metric recommendations will be described in greater detail below in conjunction with the flow diagram of FIG. 6.

Metric Recommendations

Figure 6:
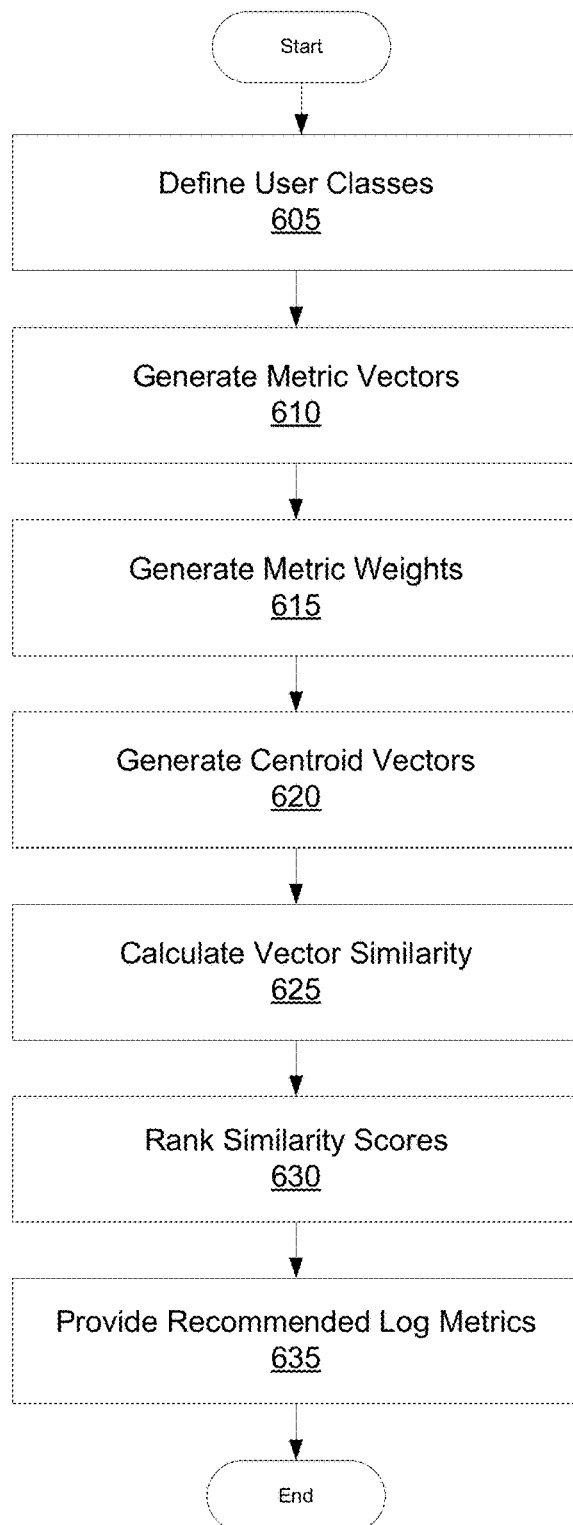
FIG. 6 shows a flowchart illustrating a method for vector space based log metric recommendations by an event logs system, according to one embodiment.

FIG. 6 shows a flowchart illustrating the method for log metric recommendation by a log analytics system. One of the benefits of the log analytic system is that users in similar classes and capacities gain insight from metric usage of other users in such classes and capacities, both within and between enterprises. Metric recommendations can therefore be generated by a log analytics system and their relevance determined through the comparison of log metrics, who uses them, where they are used, and how frequently.

The log analytics system includes program code that is configured to define 605 classes or categorizations of users based on similar capacity. Users in same classes have similar informational log metric needs and benefit from log metrics most frequently accessed by other users in those same classes. Role, time period, operation, location or combinations thereof are examples of classes used by the log analytics system but classes may also be defined through any metric parameterizations. Roles are classes defined by occupational title or positional responsibilities capacities such as product manager, user experience designer, or application administrator. Time periods are classes that define temporal capacities such as a year, quarter, month, week, or day. Operations are classes that are defined by a performance capacity, typically by task type usage. Locations are classes that are defined by topographical capacities; either geographic location or business territory of the user.

The log analytics system defines 605 classes in according to different embodiments. A first embodiment defines classes through self-categorization; users select a role, time period, location, or operation with the user interface as attributes for defining 605 a class for the recommendation module.

A second embodiment defines classes through account information by an organization at the time of registration. In this manner classes are defined in terms of vocabulary of the organization. A user is automatically assigned a class according to their account information, such as their organizational position (e.g., job title, department). A uniform taxonomy of job titles (e.g., director, supervisor, manager, engineer, analyst, etc.) that may be used across different organizations and companies allows for the generation of metrics that reflect underlying similarities in metric usage between different organizations.

A third embodiment implicitly defines classes by clustering log metrics using a clustering algorithm such as k-prototype clustering, independently of expressly defined user attributes. This approach generates the classes organically based on the similarity of the metrics themselves, and thus is useful to reveal hidden relationships and similarities between users in different roles, organizations or capacities that would not otherwise be discovered through explicitly defined classes.

Figure 7:
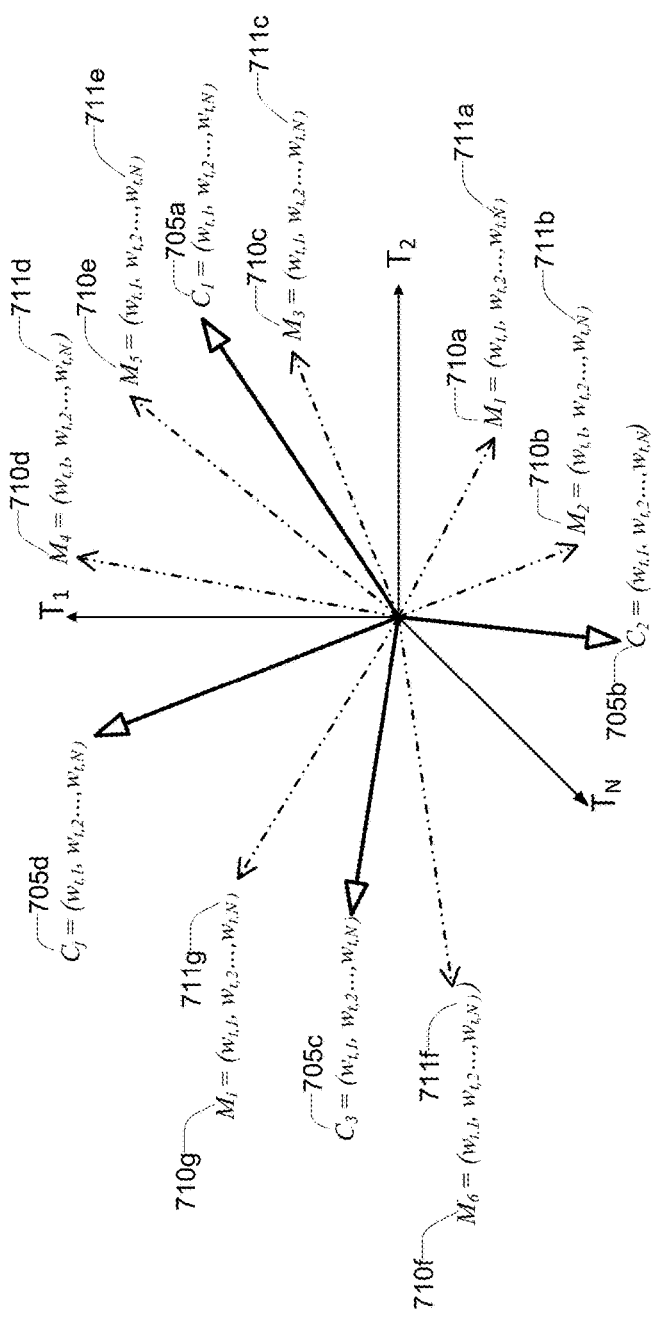
FIG. 7 shows a to a vector space model including centroid vectors and metric vectors, according to one embodiment.

The log analytics system generates 610 a corpus of vectors according to a vector space 700 model as shown in FIG. 7. The vector space 700 model is a data model that represents log metrics as algebraic vectors. The vector space representation generally allows textual documents to be compared for semantic similarity. In the specific implementation of the log analytics system, the log metrics serve as the documents.

More specifically, for each log metric stored in the database system, the recommendation module 225 generates 610 a metric vector $M_i$. A metric vector comprises a set of N vector components that correspond to a collection of N index terms $w_{tN}$. The index terms are taken from the text used for all of the metrics in the metric query tables 400 such as metric name, metric description, public and rating values, and metric comments excluding stop words (e.g. the, and, to, etc.). Additional index terms are extracted from interrogative metric parameterizations 310, general metric parameterizations 315, and application specific parameterizations 320. These terms capture the underlying aspects of the queries that implement the metrics, including the names of the table(s) used in each query, and the names of each column queried. Further, the corpus of terms is extended to include high frequency words that appear in the underlying data in each table column that is included in the metric queries. For example, for each metric, the table columns it queries are identified; for each such column all of the terms appearing in that columns are ranked by frequency of appearance in the column, and top ranked terms by frequency (e.g., top 10) are included in the vocabulary of terms for the metrics. The vector space model 700 is then created as N-dimensional index space where the $T_N$ dimensions of the model are commensurate with the N terms selected for the vocabulary. In one implementation, the metric vectors are constructed as unordered, bag-of-words term vectors.

The recommendation module 225 generates 615 term weights (symbolized as variable t) for the value(s) of each index term $w_{tN}$. Term weights characterize a degree of semantic significance for individual index term value. In an embodiment, the log analytics system uses a term frequency-inverse document frequency (tf-idf) to generate term weights, based on the frequencies with which the terms appear in the metric names, descriptions, or metric parameterization values, and column data. Thus, each metric vector is constructed as: $M_j = (w_{1,j}, w_{2,j}, \ldots, w_{k,N})$, where the vector is of cardinality N and $w_{tj}$ is the tf-idf: term frequency-inverse document frequency for the term or word T in the vocabulary vector.

In each metric vector $M_i$, the value for a given term component may be the term weight for any number of instances of the term appearing in the metric name or description, or associated metadata. Alternatively, the term weight may be scaled proportionally (or otherwise) to the number of times the index term $w_{tN}$ value appears in the metric. However, increasing values of term weights are normalized by the frequency in which the index term $w_{tN}$ value (s) occur in the vector space 700. Alternatively, the term weight value may be set prior to metric vector generation by the log analytics system. A larger term weight value may be assigned to metric parameterizations that are higher in the hierarchical level of the metric parameterization model 300 than metric parameterization that are lower. For instance, the log metric name 305 will have a higher term weight value than execution status 320$p$. Log metric values explicitly entered by an analytics user, such as the metric description or the metric importance, may have a higher term weight value than metric parameterization values. Additionally, an analytics user may manually set term weight values through the user interface to reflect a customizable value system.

The recommendation module 225 further generates a term by vector matrix [N×M] which is stored in the database system. The matrix contains each metric vector $M_i$ in the log analytics system; each metric vector $M_i$ containing N index terms $w_{tN}$. The recommendation module 225 can identify relationships between metric vectors $M_i$ by computing the measure of similarity on the any pair of vectors.

Using the metric vectors, the recommendation module 225 further generates additional M vectors for different types and level of aggregations to represent particular aspects of log metric usage behavior, and provide recommendations based thereon. A target set of vectors M with respect to a particular parameterization or grouping (e.g., user, role, organization) can be used to compute a centroid vector $C_j$ which represents the overall semantics of that aggregation. In general form, the recommendation module 225 generates recommendations by computing the similarity measure between a given metric vector or aggregate (e.g., centroid vector) and selected target set of metric vectors. The target set of metric vectors M upon which this similarity determination can be the entire collection of all metrics, or any subset thereof, such as all metrics used or created within a specific time period (e.g., last 30 days), a specific location (e.g., a particular enterprise, division, or geographic location) or other delimiting constraint. The target set M can be further delimited according to frequency of use, so that only metrics that have a minimum (e.g., threshold) level of usage, are used for the purposed of similarity computation.

Semantic similarity between vectors implies relevance, therefore metric recommendations are made by calculating 625 the similarity between a centroid vector $C_j$ and metric vectors $M_i$. The semantic similarity can be calculated using the cosine of the angle between the vectors (cosine similarity), as the sum of the pairwise multiplied elements, divided by the product of their vector lengths, as the Euclidean distance between vectors, or other similarity measures. In an embodiment, each centroid vector $C_j$ is compared to every metric vector $M_i$ in the vector space by calculating 625 the cosine angle between the centroid vector $C_j$ is compared to every metric vector $M_i$. As the degree of angular separation decreases between compared vectors the semantic similarity proportionally increases.

For each comparison between a centroid vector $C_j$ and a metric vector $M_i$ a resulting similarity score $S_{ji}$ is produced with a value from zero to one. Comparisons that do not do not share at least one index term value are assigned a similarity score $S_{ji}$ of zero while those that share identical index term are assigned a value of one. For each centroid vector $C_j$ comparison, metrics vectors $M_i$ are ranked 630 according to their similarity score $S_{ji}$. Metric vectors $M_i$ that have the highest similarity score $S_{ji}$ values share not only semantic similarity with a centroid vector $C_j$ but also log metric relevance. The metric vectors $M_i$ with similarity score $S_{ji}$ values above a threshold are ordinally listed and their corresponding log metrics are provided 630 as metric recommendations through the user interface.

Various types of specific recommendations and their associated collections of vectors are now described.

User Specific Recommendation

To provide recommendations to a user, the recommendation module 225 generates for each system user, an aggregate metric vector based on a collection of metric vectors M of the metrics created or used by the user (U, "user vector"). The user vector U, for example centroid vector $C_1$, is a representative metric vector generated 620 to embody individual metric usage behavior, representing the types of log metrics most frequently accessed by the user. This results in a unique centroid vector for each individual user. As described with FIGS. 4a and 4b, each instance of log metric access by a user results in a metric query containing metadata about the user and the specific log metric accessed. Using the user ID and timestamp metadata, the recommendation module 225 retrieves for each instance of log metric access, the corresponding metric vector from the vector matrix. Metric vectors retrieved are aggregated and their term index values averaged to generate 620 the user vector U. Upon this assumption metric recommendations can be made based on the metric vectors that are close in Euclidean distance to the centroid vector In one aspect then, the recommendation module 225 is configured to provide a user specific recommendation, by computing the similarity measure between the user vector U and a target set of metric vectors M selected from metric tables, to identify the metric vectors that are most similar to the user vector, based on the similarity scores. As noted above, target set of metric vectors M can be the entire collection of all metrics, or any subset thereof, such as all metrics used or created within a specific time period, a specific territory (e.g., a particular enterprise, division, or geographic location) or other delimiting constraint, and further delimited according to frequency of metric use. The high ranking metric vectors based on the similarity scores are displayed to the user in the dashboard 510, for example the top 10 ranked metrics. The recommendation may be provided automatically or upon user request. For example, each time the user logs into the system and opens dashboard 510, the recommendation module 225 can automatically provide a set of recommended metrics based, using a collection of metrics from the past 24 hours. This provides the user with a very up-to-date set of recommendations based on the activities of other users of the system.

Figure 8:
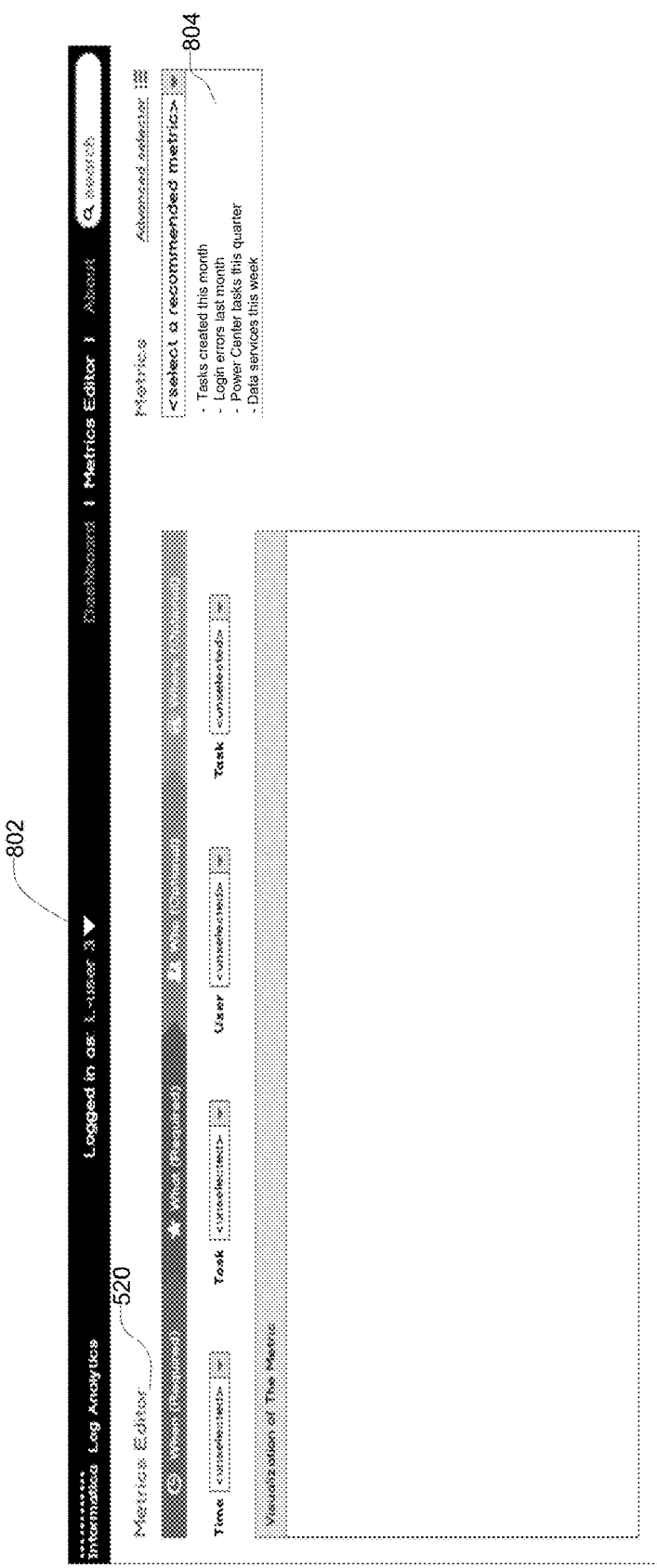
FIG. 8 shows a second screenshot of a user interface of a client application that allows a user to interact with a log analytic system, according to one embodiment.

FIG. 8 illustrates an example of this type of recommendation. Here, the user is shown as logged into the metric editor 520 with the user ID of "L-user 3". 802. The recommendation module 225 identifies for this user role the specific user vector $U_{L\text{-}user\text{-}3}$ for this user, and using this user vector, determines a set of highest ranked metric vectors, those that are most similar to the user vector. These metrics are presented to the user in the recommended metric menu 804. In the example of FIG. 8, the menu includes the recommended metrics of "Tasks created this month," "Login errors last month," "Power Center tasks this quarter," and "Data services this week."

As another example, referring to FIG. 4b, the user Brian Beats 425.2 accessed the log metric, DSS 1 year for NA-West 410.3 once, the log metric DSS-t-month 410.4 twice, the log metric DSS-1-year 410.5 twice, and the log metric DRS task in NA-West 410.6 each three times. The aggregate of the ten corresponding metric vectors are averaged and the resultant vector is the centroid vector U for the individual user Brian Beats 425.2. In this instance, the log metric associated with the metric vector $M_5$ may be recommended to Brian Beats because of its closeness to the centroid vector $C_1$.

Role Specific Recommendation

Another type of recommendation is based on the role of the user. As noted above, each user has a role (e.g., product manager, project manager, engineer, supervisor, director, analyst, etc.). The roles may be specific to the user's organization to reflect the organizations particular organizational structure, or general so as to be applicable across organizations. Each time a metric is used by a user, the role of that user is stored as part of the metadata for the metric, as shown in the metric tables described with respect to FIGS. 4a and 4b.

Accordingly, the recommendation module 225 generates 620 a role vector R for each role r, as the centroid of metric vectors created or used by users in role r. Thus, for each role r, the database of metrics is searched to identify all metrics executed by users in that role. This is collection of metrics $M_r$. The vectors corresponding to this set of metrics, $y_r$, are retrieved, and a centroid $C_r$ is computed, which serves are the role vector. For example, the centroid vector $C_2$ may be a role vector representative of a particular role r. The centroid for a particular role may be understood to represent the core features or characteristics (in the vector space) of metrics used by users in that role, and hence the types of information and queries that they most frequently use. In this manner the recommendation module 225 identifies log metrics that are behaviorally relevant by role capacity (e.g. product manager, user experience designer) within a class. For example, all metric vectors used by all product managers can be aggregated to create a product manager role vector to express the composite behavior of users employed in the capacity of product manager.

As described above, each instance of log metric access by a user results in a metric query containing metadata about the user and the specific log metric accessed. Among the metadata stored for each instance of user accesses is a Role ID, or Territory ID. Thus, when a user accesses the metrics editor 520, the recommendation module 225 can determine the user's role based on their role ID. Given the user's role, the recommendation module 225 can then access the role vector R associated with that role. Using the role vector, the recommendation module 225 can select a target set of metric vectors M, in the manner described above, and identify in the target set the metric vectors that are most similar to the role vector, based on the similarity scores. The metrics for the highly ranked metric vectors based on the similarity score are displayed to the user in the dashboard 510, for example the top 10 ranked metrics.

Figure 9:
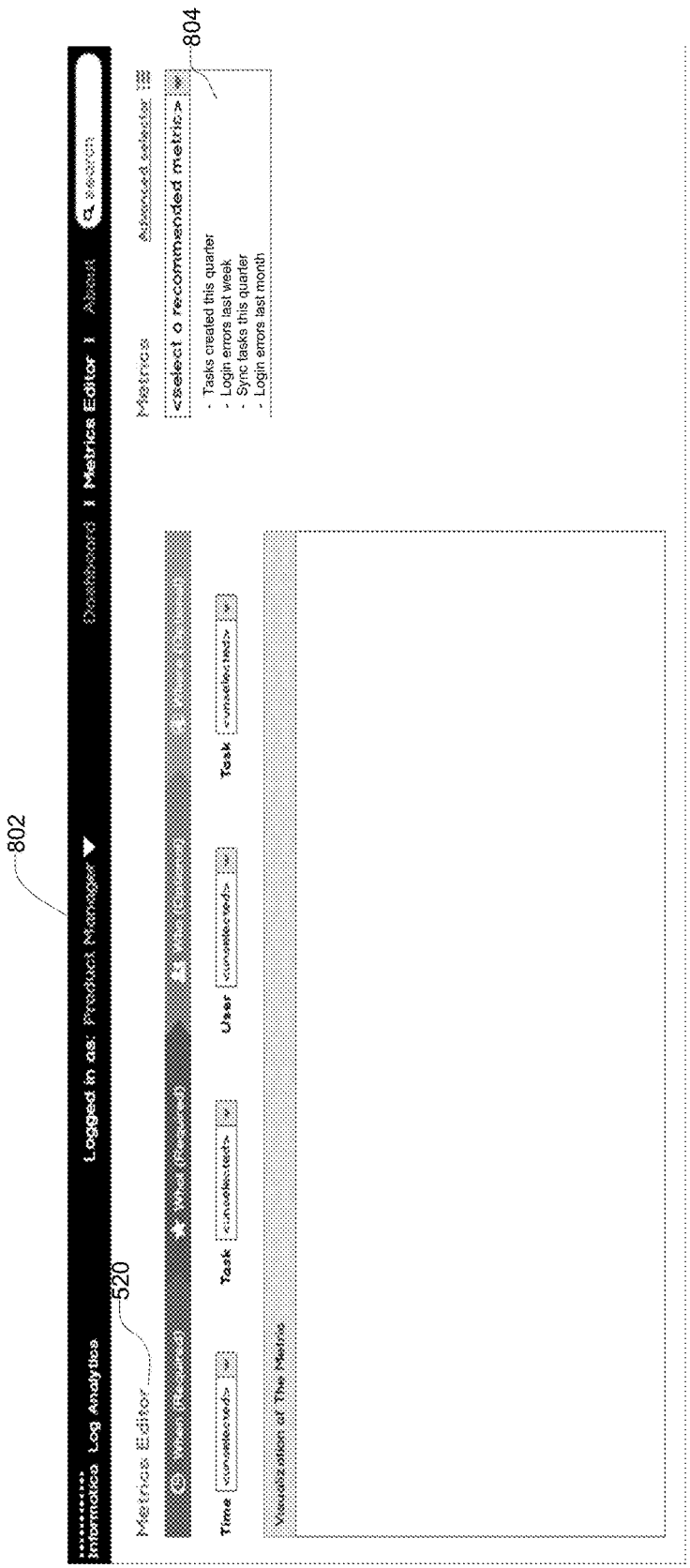
FIG. 9 shows a third screenshot of a user interface of a client application that allows a user to interact with a log analytic system, according to one embodiment.

FIG. 9 illustrates an example of this type of recommendation. Here, the user is shown as logged into the metric editor 520 with the user role of Product Manager 802. The recommendation module 225 identifies for this user role the role vector for $R_{ProductManager}$, and using this role vector, determines a set of highest ranked metric vectors, that are most similar to the role vector based on their similarity scores. These metrics are presented to the user in the recommended metric menu 804. In the example of FIG. 9, the menu includes the recommended metrics of "Tasks created this quarter," "Login errors last week," "Sync tasks this quarter," and "Login errors last month."

Territory Specific Recommendation

The use of metric vectors for users and user roles can be extended to provide for recommendations of metrics to a user based on various combinations of user and geographic or territory attribute. One such recommendation is based on geographic vectors G. A territory vector G is an aggregate vector a collection of metric vectors Mt associated with a specific geographic region or territory t. As shown in metric table 405, each metric is associated with a territory ID, which corresponds to a specific territory or geographic region, as illustrated in L-user territory table 420 in FIG. 4b. Thus, for each specific territory t, a territory vector Gt is computed from the collection Mt. The collection Mt from which the territory vector G is computed can be for all metrics used by users in a specific territory, optionally restricted further by one or more user roles, time periods, or other attributes, such as frequency of use. The centroid vector G represents the types of log metrics most relevant for the territory, and if applicable user role. In a large software company, where labor is divided by professional role and company site, users may prefer recommendations that account for both role and territory.

Thus, when a user accesses the dashboard 500, the recommendation module 225 can determine the user's associated territory. Given the user's territory, the recommendation module 225 can then access the geographic vector G associated with that territory. Using the geographic vector, the recommendation module 225 can select a target set of metric vectors M, in the manner described above, and identify in the target set the metric vectors that are most similar to the geographic vector, based on the measure of similarity. The high ranking metric vectors based on the similar measure are displayed to the user in the dashboard 510, for example the top 10 ranked metrics.

Figure 10:
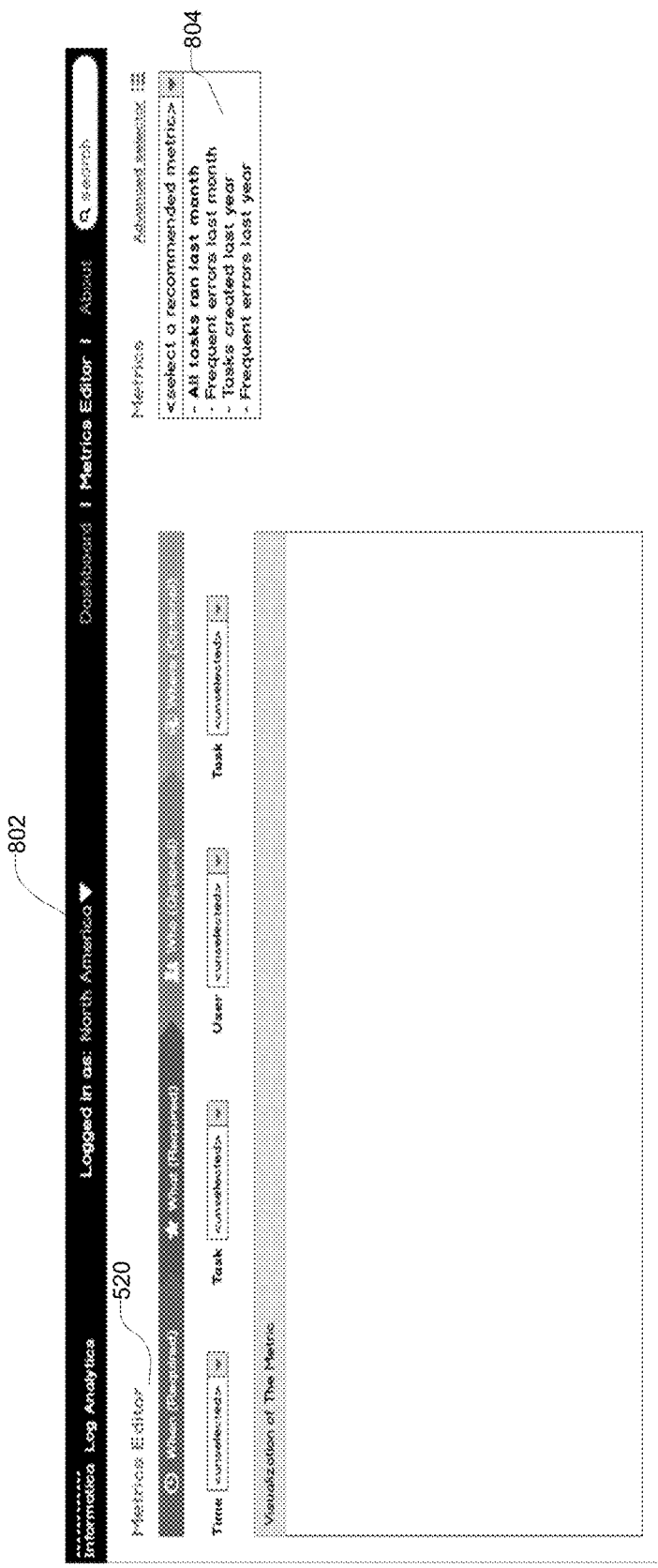
FIG. 10 shows a fourth screenshot of a user interface of a client application that allows a user to interact with a log analytic system, according to one embodiment.

FIG. 10 illustrates an example of this type of recommendation. Here, the user is shown as logged into the metric editor 520 with the territory 802 of "North America" (L-user territory). The recommendation module 225 identifies for this territory the geographic vector G, and identifies the highest ranked metric vectors. These are presented to the user in the recommended metric menu 804. In the example of FIG. 10, the menu includes the recommended metrics of "All tasks ran last month," "Frequent errors last month," "Task created last year" and "Frequent errors last year".

For instance, referring back to FIG. 4b, Adam Apple 425.1 and Chris Cherry 425.3 are employed in the role of product manager 415.1 in the North America 420.1 territory. Collectively the log metric Task-1-month 405.1 is accessed four times (see Metrics ID=1 in 405) and Task-1-year 410.2 is accessed six times (see Metrics ID=2 in 405). The ten metric vectors are aggregated and the resultant vector is the centroid vector $C_2$ serves as the territory vector G, which represents the cumulative behavior of both product managers in North America. In this instance, the log metric associated with the metric vector $M_6$ may be recommended to the product managers because of its closeness in Euclidean distance to the centroid vector $C_2$.

Typically metric recommendations provide additional perspectives in similar capacities. For example two product managers in the same job site location may benefit from the log metric used by the other. A centroid vector for their role and job site would be generated from their aggregated log metric usage. Log metrics corresponding to the metrics vectors that are similar to their aggregated representative metric vector would be provided as metric recommendations. However metric recommendations can also provide unintuitive perspective. For example, a program manager working in the front end development of a cloud application may benefit from similar metric recommendations for a user experience designer also working on the front end rather than metric recommendations for a program manager working on the back end of the same cloud application.

Metric Recommendations Based on Multiple Similarity Determinations

The metric recommendations described above have generally included a single similarity determination between a given vector (e.g., user vector, role vector, and territory vector) and a target set of metric vectors. The recommendation module 225 is further configured to generate recommendations based on multiple similarity determinations. Generally, in these embodiments, various centroid vectors $C_3$ are generated 620 for the values of one or more interrogative metric parameterization; a unique centroid vector $C_3$ for each time period, operation, users, and location parameterization. Unique centroid vectors $C_3$ can be generated 620 with ad hoc combinations of interrogative metric parameterizations such as time period/location, or users/operation, time period/operation/users/location. The ad hoc combinations are selected through the user interface and restrict which metric vectors can be sourced from the vector matrix to form a centroid vector $C_3$. Because centroid vectors $C_3$ are defined in terms of metric parameterizations they may be understood to represent specific aspects of log metrics and thus event logs rather than the behavior of users accessing log metrics. Metric recommendations are therefore formed around the metric parameterization(s) selected by a user. Metric vectors corresponding to the selected metric parameterization(s) are aggregated and the term index weights averaged to generate 620 a centroid vector $C_3$. For example, the interrogative metric parameterizations time period identifies all log metrics in the log analytics system for the specified period of time. Metric vectors corresponding to those log metrics of the selected time period are aggregated to form the centroid vector $C_3$. The following procedure is an example instantiation of the foregoing.

1. A role vector R is computed (or obtained from storage) for each of the roles.
2. A target set of M metric vectors is selected as described above.
3. The similarity between each of the M metric vectors in the target set and each of the role vectors R is computed. For each metric vector in M, the closest (i.e., most similar) role vector R is identified. This identifies, for each role vector R, a subset Mr of the metric vectors deemed associated with the role.
4. The user vector U is computed (or obtained) for each individual user.
5. The similarity between each of the M vectors in the target set and each of the user vectors is computed. For each metric vector in M, the closest (i.e., most similar) user vector U is identified. This identifies, for each user vector U, a subset Mu of the metric vectors deemed associated with the user.
6. A geographic vector G is computed (or obtained) for each user territory.
7. The similarity between each of the M vectors in the target set and each of the geographic vectors G is computed. For each metric vector in M, the closest (i.e., most similar) geographic vector G is identified. This identifies, for each geographic vector G, a subset Mg of the metric vectors deemed associated with the territory.
8. Using each of the created subsets Mr, Mu, and Mg, the recommendation module 225 can recommend one or more metrics to a user based on ad hoc combinations of grouping criteria selected upon demand by the user. For example, the user specifies in her user profile if she wants metrics recommendation based on her role and/ or user id and/or territory.

Parameter Vectors

Another type of metric vector that can be generated and used in recommendations is a parameter vector. A parameter vector is a centroid vector generated from a set of metrics corresponding to a specific value of one or more of the parameterizations shown in FIG. 3.

User Parameter Vector: For each value of user parameterization 310c, a user parameter vector UP is generated, as the centroid of metric vectors which specified a particular analytics or end user (or role) as an attribute of the metric (i.e., a particular user or role was entered as the attribute upon which the metric was generated). For example, if various or different metrics specified the user role of Product Manager as an attribute of the metric query, then these metrics would be collected to generate the centroid that serves as the user parameter vector $UP_{Product\_Manager}$. This is different from a Role Vector R for the Product Manager role because the Role Vector for Product Manager is based on only metrics created or used by Product Managers, whereas the UP for Product Manager is based on metrics created or used by any user role, so long as the Product Manager role is an attribute of the metric itself.

Next, the similarity between each of the M vectors in a target set and each of the UP vectors is computed. For each metric vector in M, the closest (i.e., most similar) user parameter vector UP is identified. This identifies, for each user parameter vector UP, a subset Mup of the metric vectors deemed associated with the user parameter.

Time Period Parameter Vector: For each value of period of time period parameterization 310a, a time period vector P is generated, as the centroid of metric vectors which specified the particular time period as an attribute of the metric (i.e. the specified time period was entered by the user at the time of the creation of the metric). For example, a time period vector would be generated for metrics that had time periods of interest for the previous 24 hours, previous week, month, month range, quarter, year, and so forth. For example, if a metric queried the number of user login failures in the previous six months, it would be included in the metrics use to compute a time period metric vector for that time period. This is different from generating a centroid based on which metrics were used in the relevant period because the time at which a metric is used is independent of the time period that the metric queries over.

The similarity between each of the M vectors in a target set and each of the time period vectors is computed. For each metric vector in M, the closest (i.e., most similar) time period vector P is identified. This identifies, for each time period vector P, a subset Mp of the metric vectors deemed associated with the metric time period.

Operation Parameter Vector: For each value of operation parameterization 310b, an operation parameter vector OP is generated, as the centroid of metric vectors which specified a particular operation as an attribute of the metric (i.e., a particular operation was entered as the attribute upon which the metric was generated). For example, if various different metrics specified the operation of a data synchronization service (DSS) as an attribute of the metric query, then these metrics would be collected to generate the centroid that serves as the operation parameter vector $OP_{DSS}$.

Next, the similarity between each of the M vectors in a target set and each of the OP vectors is computed. For each metric vector in M, the closest (i.e., most similar) operation parameter vector OP is identified. This identifies, for each operation parameter vector OP, a subset Mop of the metric vectors deemed associated with the operation parameter.

Territory Parameter Vectors: Following the same pattern as above, a territory parameter vector TP is computed as the centroid for each set of metrics for which a particular territory value as specified as an attribute of the metric. As above, these territory parameter vectors TP are different from the geographic vectors G. The latter centroids are computed from the collection of metric vectors that were generated by a user in a particular territory, whereas the former (the TP vectors) are generated from the metric vectors in which a particular territory is specified in the metric, regardless of which territory is associated with the user who created or used the metric.

Now, when the user logs in to the dashboard, the recommendation module 225 can automatically recommend one or more the parameter vectors. This is done by computing the similarity between the user vector U for the user, and each of the various parameter vectors P (time period) TP (territory), OP (operation) UP (user) with respect each of its values. The similarity can be done with respect to each type of parameter vector, and the top ranking metric vectors for each type of parameter vector can be selected and shown to the user in the metrics editor 520.

Figure 11:
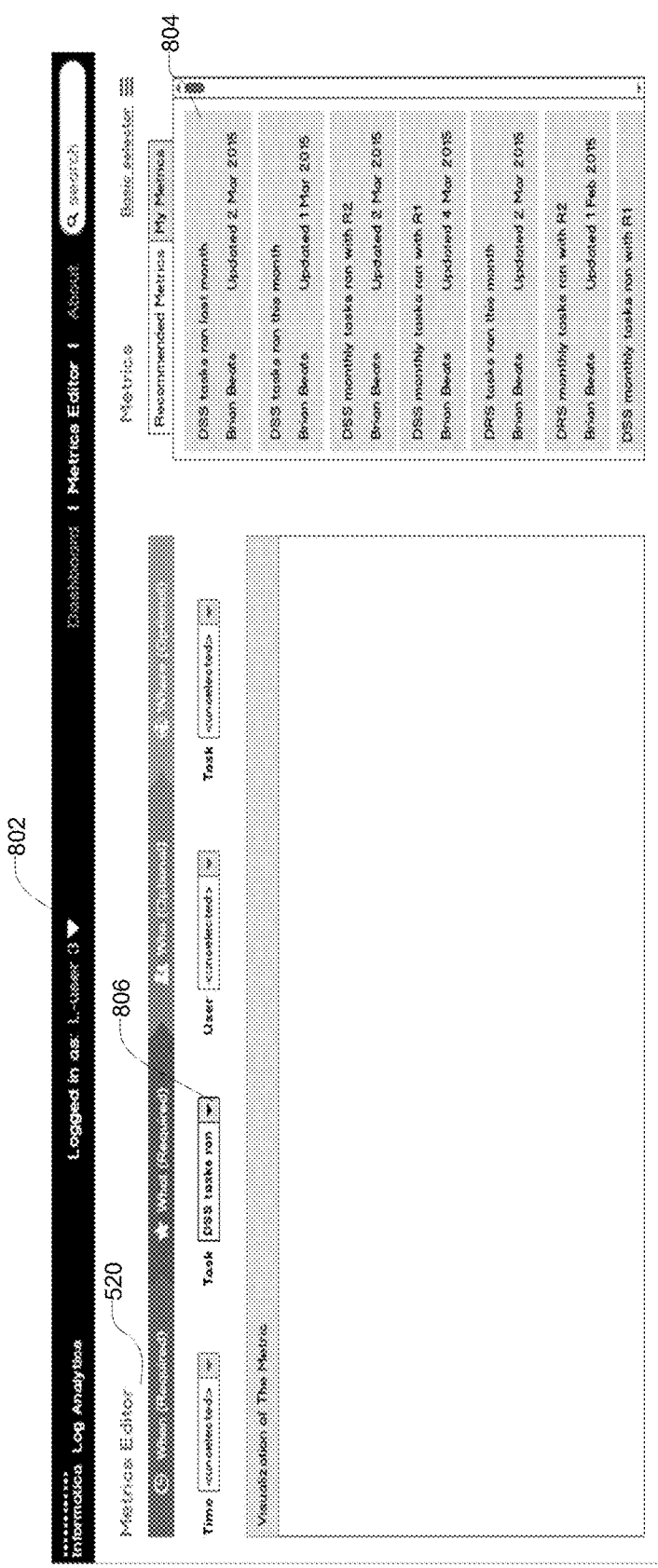
FIG. 11 shows a fifth screenshot of a user interface of a client application that allows a user to interact with a log analytic system, according to one embodiment.

FIG. 11 illustrates an example. Here, the user is shown as logged into the metric editor 520 with the user ID of "L-user 3". The user has started to create a new metric, as indicated by the selection in the Task menu 806 of the task "DSS tasks ran". In response, the recommendation module 225 obtains the operation parameter vector $OP_{DSStasksran}$ and then determines the subset $Mop_{(DSStaskran)}$ and presents the ranked rmetrics in the recommended metrics menu 804. For example, here the recommended metrics are "DSS tasks ran last month," "DSS tasks ran this month," "DSS monthly tasks ran with R2," and so forth as illustrated.

As with the previously described recommendations based on multiple similarity determinations, any of these parameter vectors can be combined with ad hoc combinations of user vectors U, geographic vectors G, and role vectors R to create highly specific sets of recommendations.

All such computations and recommendations can be performed automatically, for example when the user logs in, or on demand by a user via selection of menu item in the dashboard 510. For example, in one embodiment the recommendations are made each time a user starts creating a new metric. As the user specifies attributes for the metric, selecting particular values for the time period, location, user, and operation, the recommendation module 225 identifies the high ranked parameter vectors (and corresponding attribute values) and includes those in the menus 511 for the selection of the parameter value. For example, in response to an input in a time period field 511a of "Last quarter," the recommendation module 225 identifies the high ranked metrics associated with the time period vector $TP_{LastQuarter}$ and provides these are recommended metrics. This recommendation process is repeated with each additional parameter value entered by the user in the dashboard fields 511.

User Specific Customized Metric Vectors

As described above, the construction of the metric vectors by the recommendation module 225 uses the same set of term weights for the index terms for all users. In another embodiment, the recommendation module 225 is configured to allow user specific weights to be used for the construction of a user vector and the computation of metric vectors M that are computed in any recommendation mode.

More specifically, a user may establish, either by the user profile page and/or set up at installation time (e.g., via installation parameters specified at installation time), weighting factors to applied to the index weight terms according to the source of the terms. For example, the terms extracted from the metric name and description may be given higher weights, than term derived from the textual data extracted by profiling each table column: That is: weight (metric name)=weigh(metric description)>weight (text from column profile). The respective weights are then applied to the underlying term weights (e.g., tf-idf) to scale the term weight accordingly.

Accordingly, when generating the metric vectors, and computing similarity between vectors for a given user, the recommendation module 225 uses the user specific weights for the user, as applied to the particular source from which the terms of the metric vectors obtaining, when performing the similarity computation. This approach may be used with any of the foregoing recommendation operations.

Metric Recommendations Based on Sequential Rule Inference

Figure 12A:
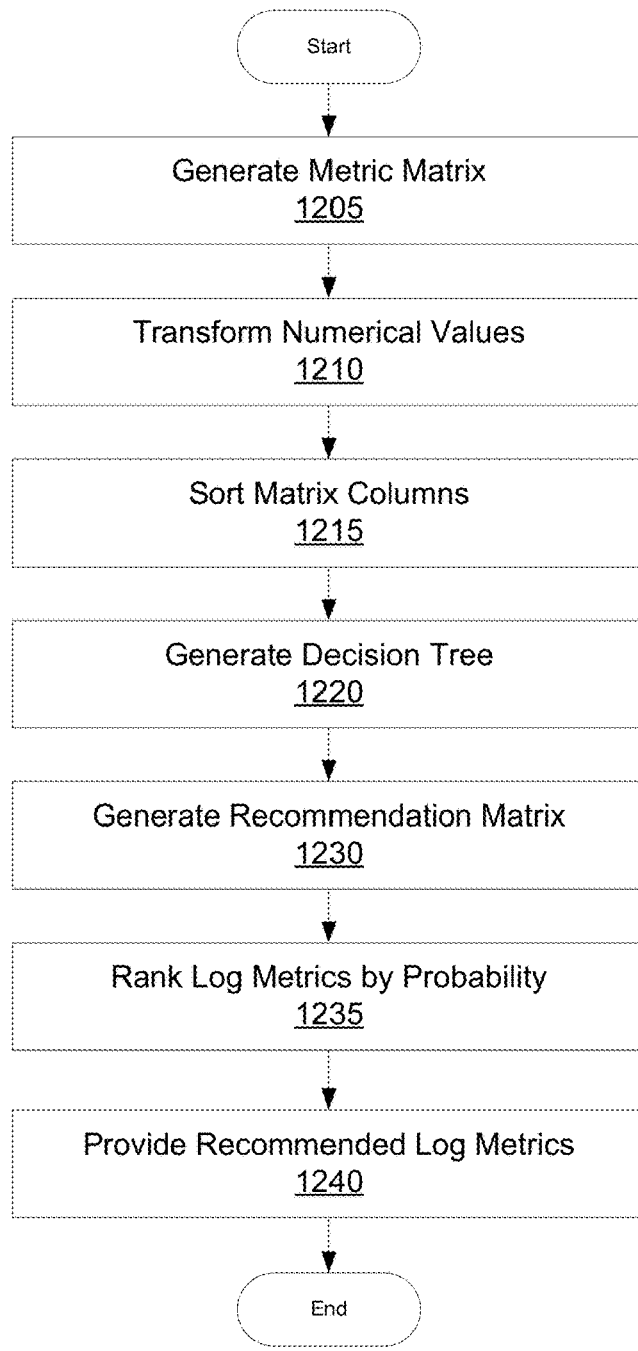
FIGS. 12a and 12b show a flowchart illustrating a method for machine learning based log metric recommendations by an event logs system, according to one embodiment.
Figure 12B:
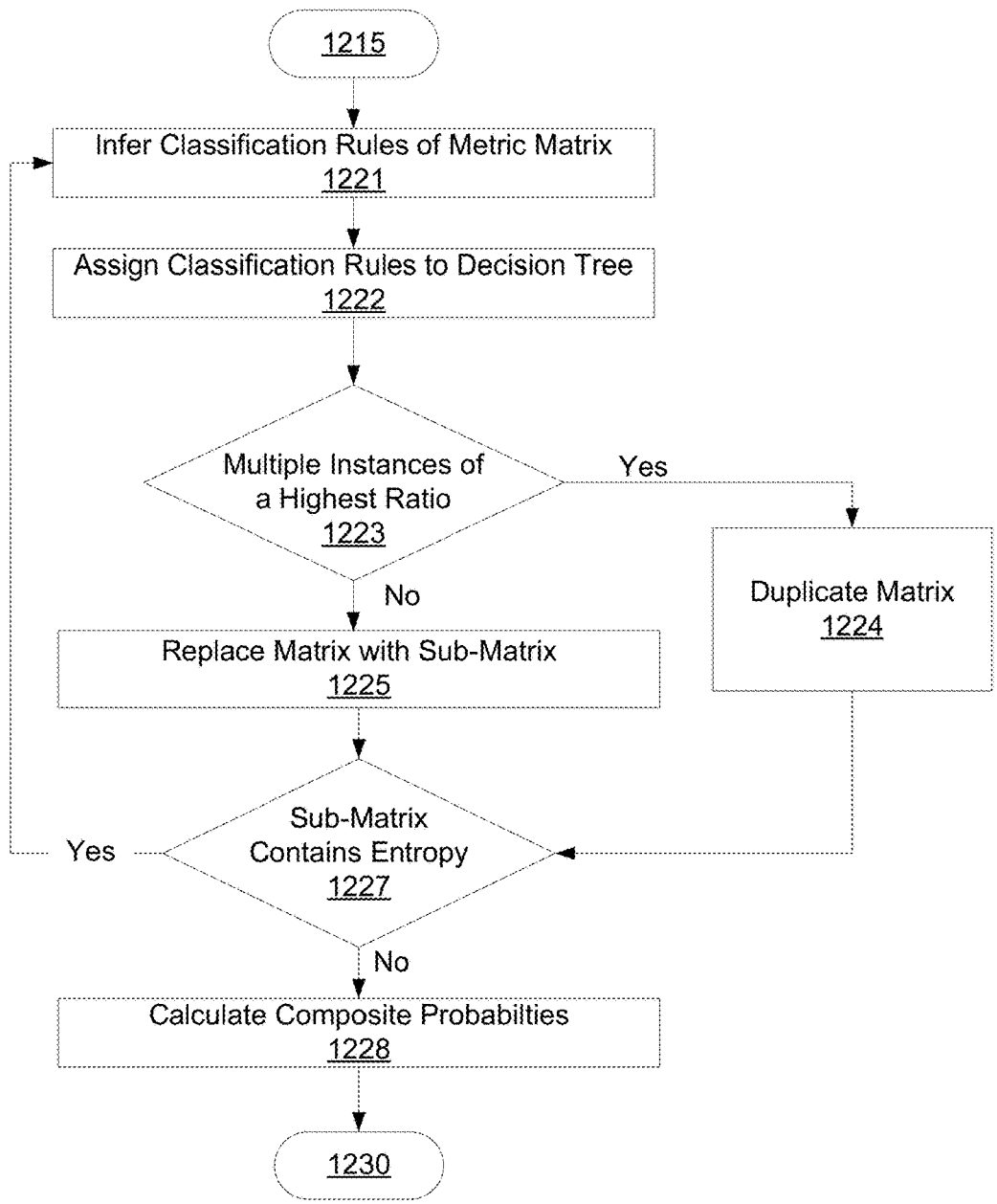

Metric vector recommendations thus far have included singular and multiple similarity determinations between a given vector and a target set of metric vectors using a vector space model. As an alternative to the use of metric vectors, metric recommendations may be generated using a rule-based inferencing model. Thus, in an alternative embodiment, the recommendation module 225 comprises program code configured as a machine learning algorithm that generates log metric recommendations through sequential rule inferences. FIGS. 12A and 12B illustrate a flowchart for generating log metric recommendations by sequential rule inference.

Sequential rule inference is an iterative machine learning algorithm that infers probabilistically independent conditional relationships between instances of data in a matrix for an intended outcome. The results of these inferences are defined as classification rules. Classification rules are conditional statements (e.g. If (P=Q) then R) comprised of a conjunctive antecedent formed with types of data in a matrix and instances of the types of the data. Conditional statements are also comprised of a consequent that is assigned a probability that quantifies interest between the conjunctive antecedent and the intended outcome. In each iteration of the sequential rule inference algorithm: 1) classification rules are generated for all instances of data in the matrix; 2) the classification rules are assigned as values in a decision tree; 3) the matrix is replaced with a sub-matrix that contains only instances of data covered by the classification rule with a highest probability; and 4) when all instances of remaining data have an almost certain probability of interest in the intended outcome, the sequential rule inference algorithm completes. Composite probabilities of interest between instances of data and intended outcome can be calculated by with a decision tree.

Referring now to FIG. 12A, the recommendation module 225 generates 1205 a metric matrix for each role (e.g. product manager) in the log analytics system 140. A metric matrix is a data set of log metric usage for all analytic users within a role. Each row in the matrix reflects a unique log metric access including metric attributes that characterize the log metric entry. Metric attributes hold values sourced from the metric query table 400 such as the metric query metadata of an analytics user (e.g. the user's name, role, and location), metric query metadata of the log metric (e.g. metric name, description, public designation or importance rating), and values sourced from the metric parameterization model 300 such as the metric parameterization metadata (e.g. when, what, who, and where interrogative metric parameterization values). Metric attributes are labeled with attribute numbers (e.g. $A_1$) that identify instances of a metric attribute in column $M_i$. Metric attributes are categorized in a column by attribute type 1305 (e.g. metric name). Metric attributes in a column are assumed to be probabilistically independent from metric attributes in other columns. The probabilistic independence of metric attributes between columns allow for classification rules to be deterministic and thus probabilities of interest in an intended outcome to be predictive.

FIG. 13A is an illustration of an example metric matrix 1300 that contains six unique log metrics accessed on twenty-five separate occasions by four individual analytic users in the product manager role (indicated by the Role ID 1315 column). The six different log metrics are: "DRS tasks in NA-West," "DSS-1-year for NA-West", "DSS-1-year", "DSS-t-month", and "Tasks-1-year", which are attribute instances $A_1$ through $A_6$, respectively. Instances of metric attributes are listed by attribute type 1305 under the columns: Metric Name ($M_A$) 1305a, L-User ID ($M_B$) 1305b, Territory ID ($M_C$) 1305c, When ($M_D$) 1305d, What ($M_E$) 1305e, Who ($M_C$) 1305f, and Where ($M_C$) 1305g. For example, the log metric Tasks-1-month ($A_5$) is accessed on four separate occasions by Adam Apple ($B_1$), and once by David Dates ($B_3$) each instance listed under the column Metric Name $M_A$ 1305a. Tasks-1-month ($A_5$) is characterized by the metric attributes: All Task ($E_1$), All users with any Access ($E_1$), in the Last Month ($D_1$), and All territories ($G_1$). A metric matrix may contain fewer or more columns of differing attribute types 1305 which increase the variance of the matrix. It should be noted however that metric attributes defined collectively such as public designation, metric rating, metric description, creation time, last update time, metric name may exhibit probabilistic dependence. Included in the metric matrix 1300 is a column with metric attributes categorized by a recommendation 1310 attribute type. In some embodiments recommendation values are derived from the metric rating and in other embodiments are submitted by analytic users. The metric attributes may hold Boolean values of either 'yes' or 'no' that represent an intended outcome for metric attribute in the metric matrix.

The recommendation module 225 transforms 1210 numerical values into discrete non-numerical values for all columns that hold numerical values. If a metric matrix contains a column of time values relating to task duration 320j, the time values in the column would be sequentially sorted into a minimal number of groupings. For instance, the numerical time values could be separated into groupings that reflect a time convention such as an a.m. or p.m. The corresponding classification attribute values for each numerical value are totaled; the classification value that holds true for the majority numerical values in the group becomes a representative value for the entire group. For instance, if five out of nine time values in the a.m. group correspond to classification attribute value of 'yes', the discretized non-numerical value for a.m. group would be 'true'.

As exemplified by metric matrix 1300 shown in FIG. 13B, the recommendation module 225 sorts 1215 log metric entries by instances of their metric attributes. In a log analytics system, metric matrices typically contain voluminous amount of data that may be measured in terabytes or petabytes. Because the size of the data can be several orders of magnitude larger than the example metric matrix 1300; sorting metric matrices prior to processing sequential rule inferences can substantially increase computational efficiency of the recommendation module 225. Starting with the first column, the recommendation module 225 sorts metric attributes into groups according to their attribute number (e.g. $A_5$). For instance, metric attributes under the column labeled Metric Name $M_A$ 1305a are sorted in into six groups including DRS task in NA-West ($A_1$) through Task-1-year ($A_6$). Metric attributes in each successive column are sorted in relation to a group instance in the previous column then further sorted according to their attribute number. For example, instances of the metric attributes Brian Beats ($B_2$) and Chris Cherry ($B_3$) located under the column labeled L-user ID ($M_B$) 1305b are placed in the same rows occupied by the group of DRS task in NA-West ($A_1$) metric attributes are then further sorted according to their respective attribute numbers ($B_2$) and ($B_3$). This approach maintains permutational order between metric attributes when initially recorded as a log metric entry in the metric matrix 1300.

The recommendation module 225 is configured to generate 1220 a decision tree used to calculate a probability of interest for an intended outcome. The decision tree is a data structure comprised of a root node, event nodes, branches, and leaf nodes. The root node is a point of origination for all nodes and branches in the decision tree; it represents instances of data to be evaluated against the intended outcome. Classification rules are expressed in a decision tree through event nodes and one or more connected branches. A conjunctive antecedent is represented by an event node connected to a singular branch. A consequent is entered as value in a branch and represents a probability of interest value iteratively inferred from a corresponding matrix. As the values are received from the corresponding matrix they are assigned to the branch of the corresponding classification rule. A decision tree may contain multiple branched paths beginning at the root node and ending at a leaf node. Leaf nodes are terminating points for branched paths and hold values that quantify the composite probability of interest along the branched path. The amount of branches for a decision tree can be determined by the amount of permutations of instances of data in the corresponding matrix. A composite probability of interest for instances of can then be determined by multiplying classification rules along each branch path.

Figure 13D:
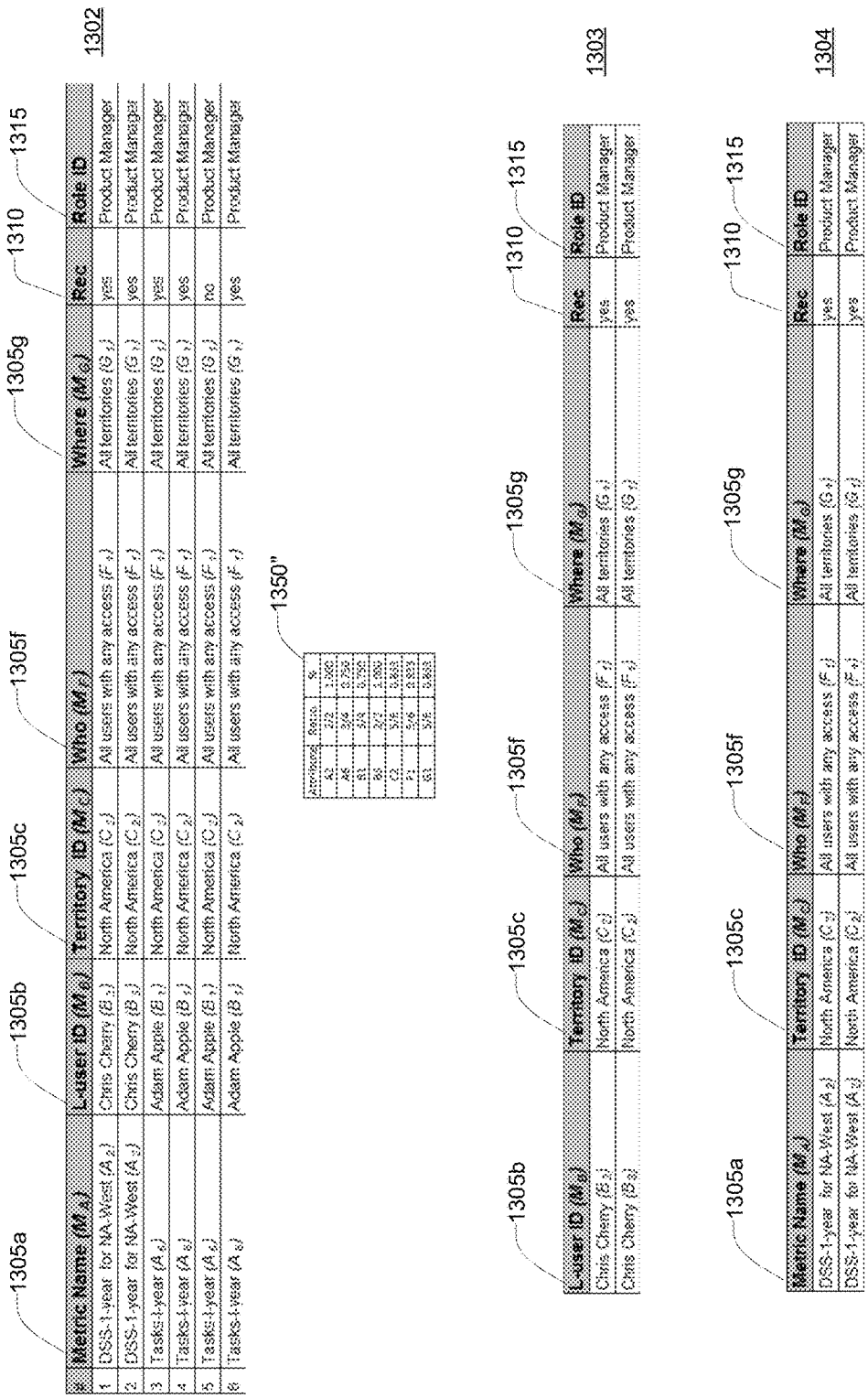
Figure 14A:
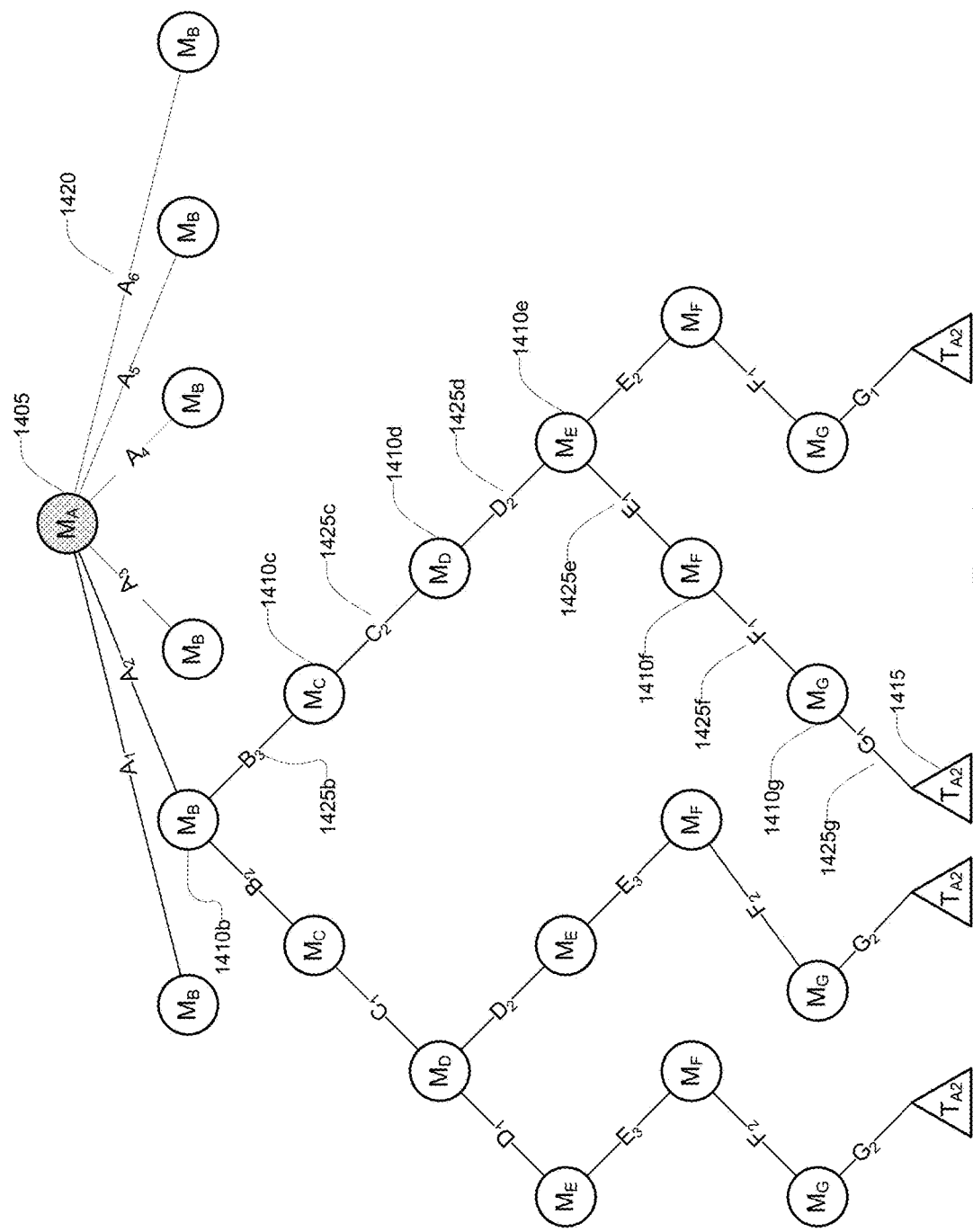

FIG. 14A is an illustrated example of decision tree 1400, structurally analogous to the example metric matrix 1300 in FIG. 13A. The analogous structure allows data inferred from the metric matrix 1300 to maintain its informational context when assigned to the decision tree 1400. The decision tree 1300 is comprised of a root node $M_A$ 1405, event nodes 1410, leaf nodes 1415 and branches 1420. Root nodes $M_A$ 1405 structure classification rules according to the attribute type Metric Name $M_A$ 1305a, located in the first column of the metric matrix 1300. Branches 1420 (e.g. $A_2$) extending from the root node $M_A$ 1405 represent instances of metric attributes (e.g. DSS-1-year or NA-West ($A_2$)) sorted under the first column. Event nodes 1410 similarly structure classification rules according to the attributes types (1305b-g) for remaining columns in the metric matrix 1300. Branches 1425 (e.g. $A_6$) extending from these event nodes 1410 represent remaining instances of metric attributes (e.g. Task-1-year ($A_6$)). The example decision tree 1400 contains four branched paths that can be traced from the root node $M_A$ 1405 to one of the four leaf nodes $T_{A2}$ 1415. The branched paths are determined according to the permutations of log metric entries in the metric matrix 1300. Each branched path represents a composite probability of interest for a log metric. The leaf nodes $T_{A2}$ 1415 are terminating points for paths in the decision tree 1400 and hold a composite probability of interest value for a log metric.

Returning to FIG. 13B, the recommendation module 225 is configured to infer 1221 classification rules from a metric matrix. A sum total of metric attributes in a column is determined according to their metric number (e.g. $A_6$). Each instance of a metric attribute in the sum total is referenced against a Boolean value in the same row and in recommendation 1310 column. A ratio is computed between a sum total of Boolean values for 'yes' and the sum total of the metric attributes. The ratio quantifies a probability of interest between the metric attribute and the intended outcome. For example, in the column Metric Name $M_A$ 1305a five instances the metric attribute Tasks-1-year ($A_6$) occur. Of those five instances of Tasks-1-year ($A_6$), three instances correspond to a Boolean 'yes' value, thus the probability of interest in the Tasks-1-year ($A_6$) is 0.600. A probability ratio contains a value that ranges from zero to one. A frequency table 1350 listing the ratios for instances of metric attributes by attribute number is included with the metric matrix 1300.

Figure 14B:
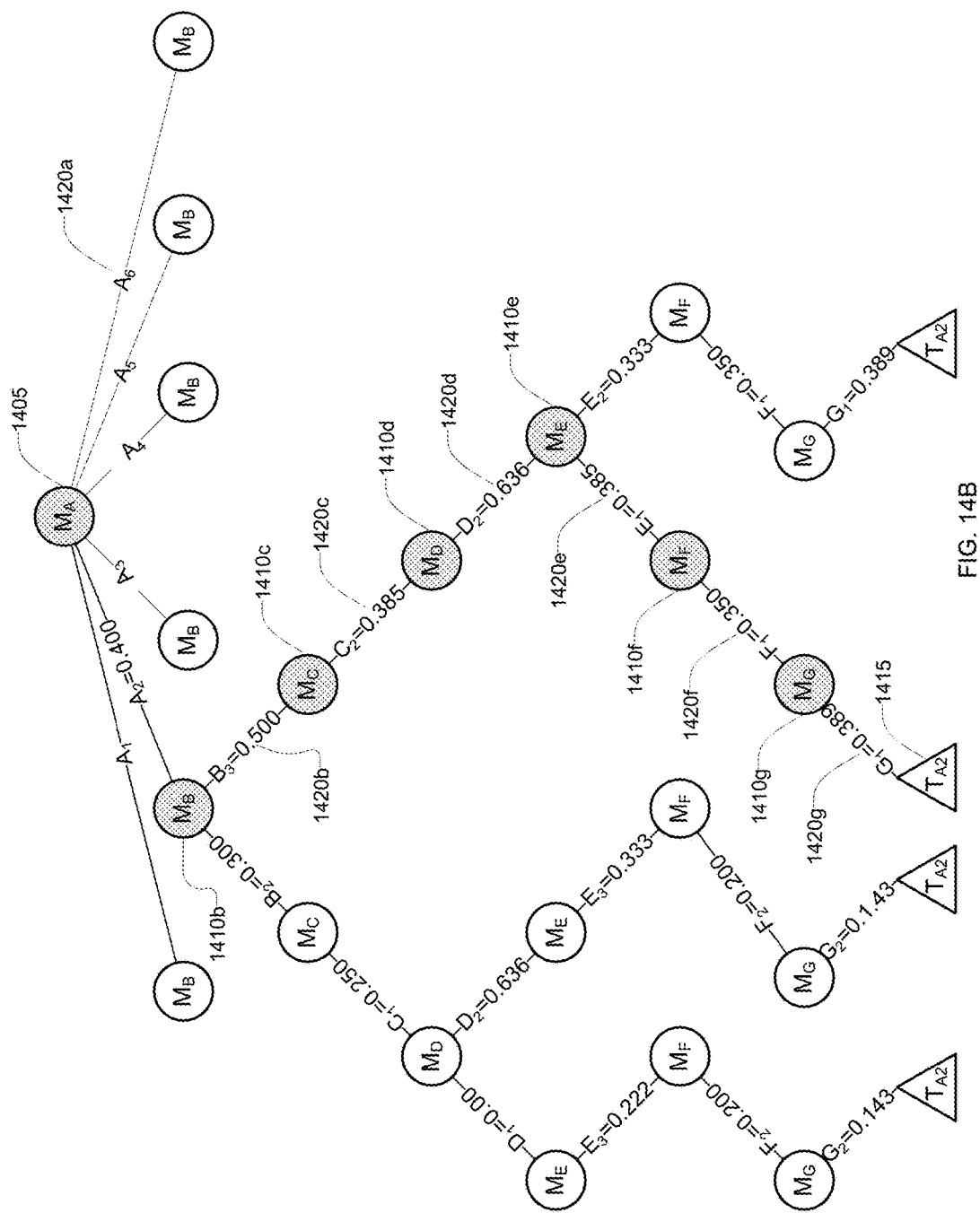

When probability ratios have been computed for all instances of metric attributes in a metric matrix, the recommendation module 225 assigns 1222 classification rules to a decision tree by labelling each branch of the tree with its corresponding probability ratio for the associated attribute. FIG. 14B illustrates the example decision tree 1400 updated with classification rules inferred from the metric matrix 1300 illustrated in FIG. 13B. For the sake of simplicity, the example decision tree 1400 is updated only with values corresponding to the metric attribute Tasks-1-year ($A_2$), whereas in practice, each of the branches of the tree would be fully updated with the computed ratios. The probability ratios listed by attribute number in the frequency table 1350 are assigned to branches labeled with a corresponding attribute number. For example, the probability ratio inferred for the metric attribute Chris Cherry ($B_3$) in the metric matrix 1300 is assigned to the $B_3$ branch 1420b of the decision tree 1400. With consequent values assigned to the branches, a complete classification rule can be determined for each node-branch combination. For example, the classification rule formed by the node $M_B$ 1410b and branch $B_3$ combination is formatted as follows, IF ($M_B$==$B_3$) THEN 0.500. The highlighted branch path indicates that has the highest composite probability for the log metric DSS-1-year ($A_2$).

Metric attributes exhibiting the highest possible probability ratios in a metric matrix also exhibit the highest amounts information gain and lowest amounts of entropy. Information gain defines how important a particular attribute is in relation to other attributes. Entropy characterizes the amount uncertainty in a collection of attributes. In each iteration of a sequential rule inference algorithm, a metric matrix is replaced with a sub-matrix. In the metric matrix, a metric attribute with the highest probability ratio is used by the recommendation module 225 to eliminate metric attributes with low probability ratios. As each iterative sub-matrix is filtered from metric attributes with low probability ratios, the amount of entropy in the new sub-matrix is decreased and the amount in information gain increased. Classifications rules generated from sub-matrices with higher information gain and lower entropy contribute to a higher overall predictive accuracy of a decision tree comprised of classification rules.

Returning to FIG. 13B, in one embodiment the recommendation module 225 is further configured to determine 1223 multiple instances of a highest probability ratio in a metric matrix using a frequency table. The frequency table 1350 indicates Last-year ($D_2$) is the metric attribute with a highest probability ratio. Accordingly, the recommendation module 225 replaces 1225 the metric matrix 1300 with a sub-matrix using just the rows that have the value of Last-year ($D_2$) for the When metric attribute, as illustrated in FIG. 13C. That is, the recommendation module 225 extracts all metric attributes in the same rows (5-12 and 20-24) as the metric attribute Last-year ($D_2$) and places them in the sub-matrix 1301. The recommendation module 225 does not include the When ($M_D$) 1305d column in the sub-matrix 1301, since all rows are already characterized by this value. The recommendation module 225 then determines 1227 if there is entropy in the sub-matrix 130 by checking for Boolean false/no values in the recommendation 1310 column. Because Boolean 'no' values exist the recommendation 1310 column, the recommendation module 225 begins the second iteration.

Figure 14C:
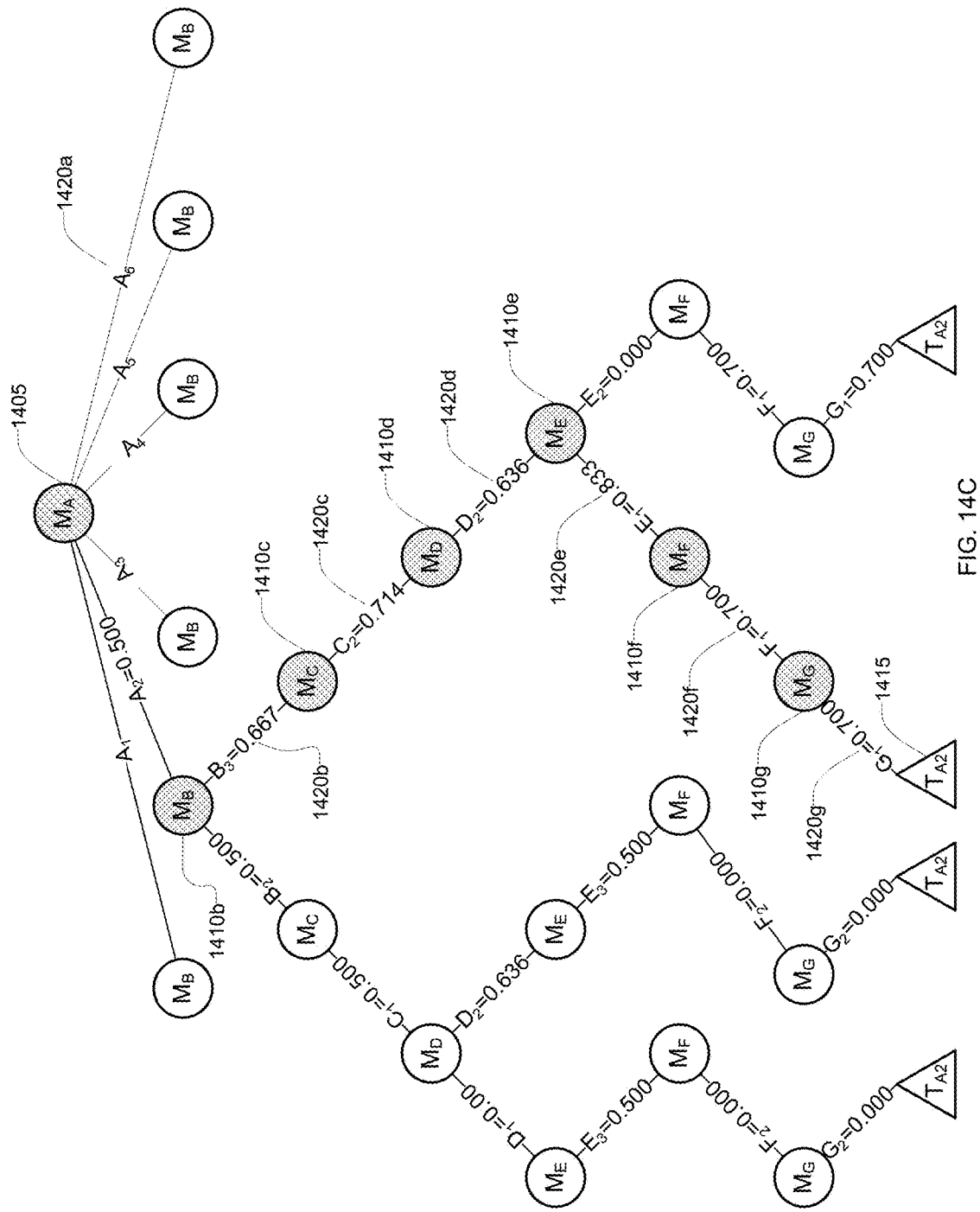

In a second iteration the recommendation module 225 similarly processes the sub-matrix 1301 and generates an updated frequency table 1350' and decision tree 1403, as illustrated in FIG. 14C. Updated classification rules are inferred from the sub-matrix 1301 and frequency table 1350' and assigned to their appropriate branches in the decision tree 1402. Again, the recommendation module 225 then evaluates the recommendation column 1310 for any false/no values, and as shown in FIG. 13C, the recommendation 1310 columns contains Boolean 'no' values so the recommendation module initiates a third iteration.

Figure 14D:
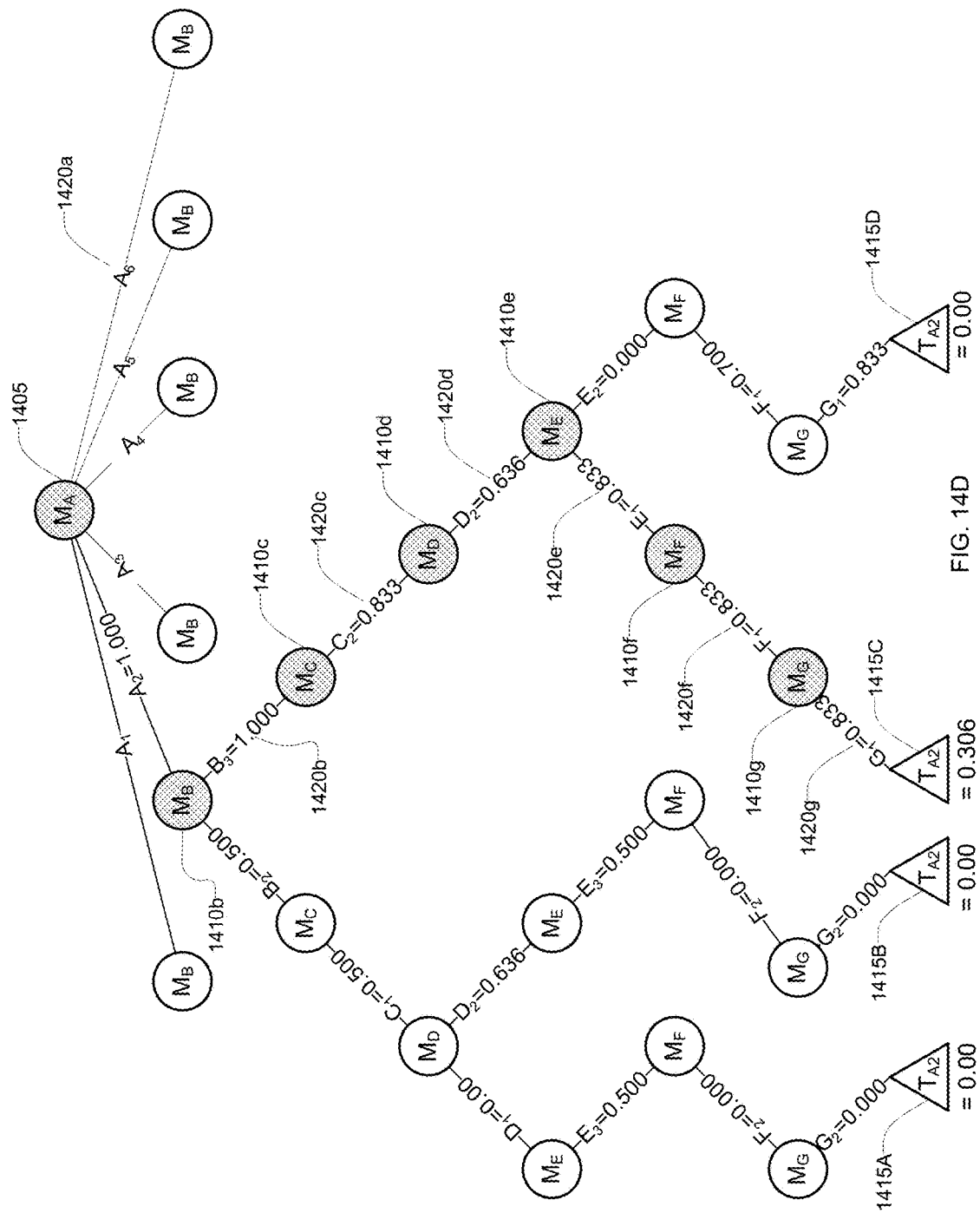

In a third iteration the recommendation module 225 similarly process the sub-matrix 1302, updated frequency table 1350", and the decision tree 1403, as show in FIG. 13D and FIG. 14D respectively. Updated classification rules are inferred from the sub-matrix 1302 and frequency table 1350" and assigned to their appropriate branches in the decision tree 1403. The recommendation module 225 determines 1223 if there are multiple instances of a highest probability ratio in the sub-matrix 1302. The frequency table 1350" indicates the metric attributes Chris-Cherry ($D_3$) and DSS-1-year for NA-West ($A_3$) each have a probability ratio of 1. The recommendation module 225 duplicates 1224 the sub-matrix 1302 into the two sub-matrices 1303 and 1304. The recommendation module 225 then determines 1227 that there is no entropy for each sub-matrix 1301 because only 'yes' values exist in each recommendation 1310 column. This completes the iterative generation of decision trees.

As shown in FIG. 14D, the recommendation module 225 calculates 1228 composite probabilities along each branch path in the final decision tree 1403 starting at the root node 1405 and ending at each leaf node 1415. The leaf node 1415c holds the composite probability of interest for the metric attribute DSS-1-year or NA-West $A_2$. If multiple alternative probabilities of interest were learned for the same the same log metric then the recommendation module 225 computes an average of their composite probabilities. Additionally, the recommendation module 225 the system can also factor the importance weights that may have been assigned to metric parameterizations, a priori.

Turning now to FIG. 15, the recommendation module 225 generates 1230 a recommendation matrix 1500 used to predict the degree of interest an analytics user may have in a log metric for a given role. The recommendation matrix 1500 is comprised of columns that contain values for a Role ID 1515, a Metric Name ($M_A$) 1505, and an Interest 1515. The Interest 1515 column contains composite probabilities that quantify interest in a corresponding log metric. The quantification of interest allows log metrics to be ordinally ranked 1235 by their probabilities of interest values by the recommendation module 225. The log metrics above a threshold are provided 1240 as metric recommendations through the user interface. In this example, the recommendations are for metrics based on the product manager role.

As can be appreciated, the foregoing methodology can be repeated with respect to any metric attribute to generate recommendations based on users, territories, tasks, time periods or combinations thereof. Recommendations can be performed automatically, for example when an analytics user logs in the log analytics system 140, or on demand by a user via selection of menu item in the dashboard 510.

Alternative Embodiments

It is to be understood that the Figures and descriptions of the present invention have been simplified to illustrate elements that are relevant for a clear understanding of the present invention, while eliminating, for the purpose of clarity, many other elements found in a typical log analytics system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer executed method for generating log metric recommendations for a user of a log analytics system, the method comprising:
   storing in a database a plurality of log metrics, each log metric defining a query on a database of log events in an enterprise system, each log metric having a metric name, a metric description, and one or more metric parameters;
   storing in the database metric usage data indicating usage of the log metrics by users;
   for each log metric in the database, generating a metric vector comprising a term vector having plurality of term weights, wherein the terms of the term vectors are selected from terms used in the metric name, metric description, or the one or more metric parameters, and wherein the term weights correspond to a measure of frequency of the terms appearing in the log metric;
   querying the database metric usage data to select metric vectors used by the user and generating a user vector for the user as a centroid of the selected metric vectors;
   selecting a target set of log metrics from the database and determining a corresponding set of metric vectors;
   for each metric vector in the set of metric vectors, generating a similarity score between the metric vector and the user vector;
   ranking the metric vectors in the set of metric vectors based on their similarity scores to obtain one or more highest ranking metric vectors; and
   displaying an output in the log analytics system of at least one log metric corresponding to at least one of the one or more highest ranking metric vectors.

2. The method of claim 1, further comprising determining a user classification by one or more of:
   assignment of user classification selected by the user through a user interface;
   assignment of user classification through account information at the time of registration; or
   assignment of user classification through a clustering of log metrics by a clustering algorithm.

3. The method of claim 2, wherein the clustering algorithm is a k-prototype clustering algorithm.

4. The method of claim 1, wherein term weights are generated using a term-frequency or inverse document frequency value for each term.

5. The method of claim 1, wherein values of log metric terms are extracted from event logs.

6. The method of claim 1, wherein each log metric is structured according to a metric parameterization model.

7. The method of claim 1, wherein values of terms from the term vector are populated with values of terms from the log metric.

8. The method of claim 1, wherein values of terms from the term vector are populated with values from a metric query table.

9. The method of claim 8, wherein the metric query table is a chronological record of log metric access by users of the log analytics system.

10. The method of claim 1, wherein log metrics are accessed through a user interface, the user interface comprising:
    a first display interface configured to display recommended log metrics;
    a second display interface configured to display log metrics; and
    an editing interface configured to receive edits of log metrics.

11. A computer executed method for generating log metric recommendations for a user of a log analytics system, the method comprising:
    storing in a database a plurality of log metrics, each log metric defining a query on a database of log events in an enterprise system, each log metric having a metric name, metric description, and one or more metric parameters;
    storing in the database metric usage data indicating usage of the log metrics by users, each user having a role in a plurality of organizational roles;
    for each log metric in the database, generating a metric vector comprising a term vector having plurality of term weights, wherein the terms of the term vectors are selected from terms used in the metric name, metric description, or the one or more metric parameters, and wherein the term weights correspond to a measure of frequency of the terms appearing in the log metric;
    querying the database metric usage data to select metric vectors used by the user and generating a user vector for the user as a centroid of the selected metric vectors;
    selecting a target set of log metrics from the database and determining a corresponding set of metric vectors;
    for each role in the plurality of organization roles:
       querying the database metric usage data to select metric vectors used by users in the role and generating a role vector for the role as a centroid of the selected metric vectors;
       for each metric vector in the set of metric vectors, generating a similarity score between the metric vector and the role vector; and
       ranking the metric vectors in the set of metric vectors based on their similarity scores to the role vector to determine one or more highest ranking metric vectors for the role vector;
    for each role vector, generating a second similarity score between the role vector and the user vector;
    ranking the role vectors based on their second similarity scores, to determine a highest ranking role vector for the user vector;
    querying the database for the one or more highest ranking metric vectors for the highest ranked role vector; and
    displaying an output in the log analytics system of at least one log metric corresponding to at least one of the one or more highest ranking metric vectors.

12. A computer executed method for generating log metric recommendations for a user of a log analytics system, the method comprising:
- storing in a database a plurality of log metrics, each log metric defining a query on a database of log events in an enterprise system, each log metric having a metric name, metric description, and one or more metric parameters;
- storing in the database metric usage data indicating usage of the log metrics by users, each user having a geographic territory in a plurality of geographic territories;
- for each log metric in the database, generating a metric vector comprising a term vector having plurality of term weights, wherein the terms of the term vectors are selected from terms used in the metric name, metric description, or one or more metric parameters, and wherein the term weights correspond to a measure of frequency of the terms appearing in the log metric;
- querying the database metric usage data to select metric vectors used by the user and generating a user vector for the user as a centroid of the selected metric vectors;
- selecting a target set of log metrics from the database and determining a corresponding set of metric vectors;
- for each geographic territory in the plurality of geographic territories:
  - querying the database metric usage data to select metric vectors used by users in the geographic territory and generating a territory vector for the geographic territory as a centroid of the selected metric vectors;
  - for each metric vector in the set of metric vectors, generating a similarity score between the metric vector and the territory vector; and
  - ranking the metric vectors in the set of metric vectors based on their similarity scores to the territory vector to determine one or more highest ranking metric vectors for the territory vector;
- for each territory vector, generating a second similarity score between the territory vector and the user vector;
- ranking the territory vectors based on their second similarity scores to obtain a highest ranking territory vector for the user vector;
- querying the database for the one or more highest ranking metric vectors for the highest ranked territory vector; and
- displaying an output in the log analytics system of at least one log metric corresponding to at least one of the one or more highest ranking metric vectors.

13. A method for generating log metric recommendations by metric parameterizations, the method comprising:
- determining a plurality of metric parameters corresponding to a plurality of log metrics in a data set;
- for each of the plurality of log metrics in the data set:
  - generating a term vector corresponding to the log metric, each term vector comprising a set of terms; and
  - generating a term weight for each term in the set of terms of the term vector;
- for a selected metric parameter in the plurality of metric parameters:
  - determining a plurality of term vectors that correspond to the selected metric parameter;
  - generating a parameter centroid vector, the parameter centroid vector comprising a composite term vector averaged across a set of term vectors in the plurality of term vectors;
  - calculating a similarity score for each term vector in the plurality of term vectors based on a similarity to the parameter centroid vector;
  - comparing each of the similarity scores to a threshold to identify one or more term vectors having similarity scores exceeding the threshold; and
  - determining recommended log metrics for the selected metric parameter as one or more log metrics corresponding to the identified one or more term vectors.

14. The method of claim 13, wherein the term weights are generated using a term-frequency or inverse document frequency value for each term.

15. The method of claim 13, wherein values of log metric terms are extracted from event logs.

16. The method of claim 13, wherein each log metric is structured according to a metric parameterization model.

17. The method of claim 13, wherein values of terms from the term vector are populated with values of terms from the log metric.

18. The method of claim 13, wherein values of terms from the term vector are populated with values from a metric query table.

19. The method of claim 18, wherein the metric query table is a chronological record of log metric access by users of a log analytics system.

20. The method of claim 13, wherein log metrics are accessed through a user interface, the user interface comprising:
- a first display interface configured to display recommended log metrics;
- a second display interface configured to display log metrics; and
- an editing interface configured to receive edits of log metrics.

21. At least one non-transitory computer-readable medium storing computer-readable instructions that, when executed by one or more computing devices, cause at least one of the one or more computing devices to:
- store in a database a plurality of log metrics, each log metric defining a query on a database of log events in an enterprise system, each log metric having a metric name, a metric description, and one or more metric parameters;
- store in the database metric usage data indicating usage of the log metrics by users;
- for each log metric in the database, generate a metric vector comprising a term vector having plurality of term weights, wherein the terms of the term vectors are selected from terms used in the metric name, metric description, or the one or more metric parameters, and wherein the term weights correspond to a measure of frequency of the terms appearing in the log metric;
- query the database metric usage data to select metric vectors used by the user and generate a user vector for the user as a centroid of the selected metric vectors;
- select a target set of log metrics from the database and determine a corresponding set of metric vectors; and
- for each metric vector in the set of metric vectors, generate a similarity score between the metric vector and the user vector;
- rank the metric vectors in the set of metric vectors based on their similarity scores to obtain one or more highest ranking metric vectors; and
- display an output in the log analytics system of at least one log metric corresponding to at least one of the one or more highest ranking metric vectors.

22. At least one non-transitory computer-readable medium storing computer-readable instructions that, when executed by one or more computing devices, cause at least one of the one or more computing devices to:
- store in a database a plurality of log metrics, each log metric defining a query on a database of log events in an enterprise system, each log metric having a metric name, metric description, and one or more metric parameters;
- store in the database metric usage data indicating usage of the log metrics by users, each user having a role in a plurality of organizational roles;
- for each log metric in the database, generate a metric vector comprising a term vector having plurality of term weights, wherein the terms of the term vectors are selected from terms used in the metric name, metric description, or the one or more metric parameters, and wherein the term weights correspond to a measure of frequency of the terms appearing in the log metric;
- query the database metric usage data to select metric vectors used by the user and generate a user vector for the user as a centroid of the selected metric vectors;
- select a target set of log metrics from the database and determine a corresponding set of metric vectors;
- for each role in the plurality of organization roles:
  - query the database metric usage data to select metric vectors used by users in the role and generating a role vector for the role as a centroid of the selected metric vectors;
  - for each metric vector in the set of metric vectors, generate a similarity score between the metric vector and the role vector; and
  - rank the metric vectors in the set of metric vectors based on their similarity scores to the role vector to determine one or more highest ranking metric vectors for the role vector;
- for each role vector, generate a second similarity score between the role vector and the user vector;
- rank the role vectors based on their second similarity scores, to determine a highest ranking role vector for the user vector;
- query the database for the one or more highest ranking metric vectors for the highest ranked role vector; and
- display an output in the log analytics system of at least one log metric corresponding to at least one of the one or more highest ranking metric vectors.

23. At least one non-transitory computer-readable medium storing computer-readable instructions that, when executed by one or more computing devices, cause at least one of the one or more computing devices to:
- store in a database a plurality of log metrics, each log metric defining a query on a database of log events in an enterprise system, each log metric having a metric name, metric description, and one or more metric parameters;
- store in the database metric usage data indicating usage of the log metrics by users, each user having a geographic territory in a plurality of geographic territories;
- for each log metric in the database, generate a metric vector comprising a term vector having plurality of term weights, wherein the terms of the term vectors are selected from terms used in the metric name, metric description, or one or more metric parameters, and wherein the term weights correspond to a measure of frequency of the terms appearing in the log metric;
- query the database metric usage data to select metric vectors used by the user and generate a user vector for the user as a centroid of the selected metric vectors;
- select a target set of log metrics from the database and determine a corresponding set of metric vectors;
- for each geographic territory in the plurality of geographic territories:
  - query the database metric usage data to select metric vectors used by users in the geographic territory and generating a territory vector for the geographic territory as a centroid of the selected metric vectors;
  - for each metric vector in the set of metric vectors, generate a similarity score between the metric vector and the territory vector; and
  - rank the metric vectors in the set of metric vectors based on their similarity scores to the territory vector to determine one or more highest ranking metric vectors for the territory vector;
- for each territory vector, generate a second similarity score between the territory vector and the user vector;
- rank the territory vectors based on their second similarity scores to obtain a highest ranking territory vector for the user vector;
- query the database for the one or more highest ranking metric vectors for the highest ranked territory vector; and
- display an output in the log analytics system of at least one log metric corresponding to at least one of the one or more highest ranking metric vectors.

24. At least one non-transitory computer-readable medium storing computer-readable instructions that, when executed by one or more computing devices, cause at least one of the one or more computing devices to:
- determine a plurality of metric parameters corresponding to a plurality of log metrics in a data set;
- for each of the plurality of log metrics in the data set:
  - generate a term vector corresponding to the log metric, each term vector comprising a set of terms; and
  - generate a term weight for each term in the set of terms of the term vector;
- for a selected metric parameter in the plurality of metric parameters:
  - determine a plurality of term vectors that correspond to the selected metric parameter;
  - generate a parameter centroid vector, the parameter centroid vector comprising a composite term vector averaged across a set of term vectors in the plurality of term vectors;
  - calculate a similarity score for each term vector in the plurality of term vectors based on a similarity to the parameter centroid vector;
  - compare each of the similarity scores to a threshold to identify one or more term vectors having similarity scores exceeding the threshold; and
  - determine recommended log metrics for the selected metric parameter as one or more log metrics corresponding to the identified one or more term vectors.

25. An apparatus for generating log metric recommendations for a user of a log analytics system, the apparatus comprising:
- one or more processors; and
- one or more memories operatively coupled to at least one of the one or more processors and having instructions stored thereon that, when executed by at least one of the one or more processors, cause at least one of the one or more processors to:

store in a database a plurality of log metrics, each log metric defining a query on a database of log events in an enterprise system, each log metric having a metric name, a metric description, and one or more metric parameters;

store in the database metric usage data indicating usage of the log metrics by users;

for each log metric in the database, generate a metric vector comprising a term vector having plurality of term weights, wherein the terms of the term vectors are selected from terms used in the metric name, metric description, or the one or more metric parameters, and wherein the term weights correspond to a measure of frequency of the terms appearing in the log metric;

query the database metric usage data to select metric vectors used by the user and generate a user vector for the user as a centroid of the selected metric vectors;

select a target set of log metrics from the database and determine a corresponding set of metric vectors; and for each metric vector in the set of metric vectors, generate a similarity score between the metric vector and the user vector;

rank the metric vectors in the set of metric vectors based on their similarity scores to obtain one or more highest ranking metric vectors; and display an output in the log analytics system of at least one log metric corresponding to at least one of the one or more highest ranking metric vectors.

* * * * *